United States Patent
Reiter et al.

(10) Patent No.: US 10,467,347 B1
(45) Date of Patent: Nov. 5, 2019

(54) METHOD AND APPARATUS FOR NATURAL LANGUAGE DOCUMENT ORCHESTRATOR

(71) Applicant: Arria Data2Text Limited, Aberdeen (GB)

(72) Inventors: Ehud Baruch Reiter, Aberdeen (GB); Kapila Annuruddha Ponnamperuma Arachchi, Aberdeen (GB); Michael Simon Schlafli, Aberdeen (GB); Neil Stuart Burnett, Aberdeen (GB); Nikhil Dinesh, Aberdeen (GB)

(73) Assignee: ARRIA DATA2TEXT LIMITED, Aberdeen (GB)

( * ) Notice: Subject to any disclaimer, the term of this patent is extended or adjusted under 35 U.S.C. 154(b) by 0 days.

(21) Appl. No.: 15/338,991

(22) Filed: Oct. 31, 2016

(51) Int. Cl.
*G06F 17/27* (2006.01)
*G06F 17/28* (2006.01)
*G06F 16/93* (2019.01)
*G06F 16/33* (2019.01)

(52) U.S. Cl.
CPC ...... *G06F 17/2881* (2013.01); *G06F 16/3344* (2019.01); *G06F 16/93* (2019.01); *G06F 17/271* (2013.01); *G06F 17/273* (2013.01); *G06F 17/2755* (2013.01)

(58) Field of Classification Search
USPC ...................................................... 704/1–20
See application file for complete search history.

(56) References Cited

U.S. PATENT DOCUMENTS

| | | |
|---|---|---|
| 5,181,250 A | 1/1993 | Morgan et al. |
| 5,237,502 A | 8/1993 | White et al. |
| 5,311,429 A | 5/1994 | Tominaga |
| 5,321,608 A | 6/1994 | Namba et al. |
| 5,629,687 A | 5/1997 | Sutton et al. |
| 5,794,177 A | 8/1998 | Carus et al. |
| 5,802,488 A | 9/1998 | Edatsune |
| 6,023,669 A | 2/2000 | Suda et al. |
| 6,078,914 A | 6/2000 | Redfern |
| 6,138,087 A | 10/2000 | Budzinski |
| 6,266,617 B1 | 7/2001 | Evans |
| 6,442,485 B2 | 8/2002 | Evans |
| 6,466,899 B1 | 10/2002 | Yano et al. |

(Continued)

FOREIGN PATENT DOCUMENTS

| | | |
|---|---|---|
| AU | 2011247830 B2 | 12/2011 |
| AU | 2011253627 B2 | 12/2011 |

(Continued)

OTHER PUBLICATIONS

U.S. Appl. No. 13/186,346, filed Jul. 19, 2011; In re: Nichols et al., entitled *Method and Apparatus for Triggering the Automatic Generation of Narratives*.

(Continued)

*Primary Examiner* — Abul K Azad

(74) *Attorney, Agent, or Firm* — Alston & Bird LLP

(57) ABSTRACT

Methods, apparatuses, and computer program products are described herein that are configured to be embodied as a natural language document orchestrator. In some example embodiments, a method is provided that comprises generating natural language text. The method of this embodiment may also include executing document orchestration requests from a scripted input language file.

20 Claims, 11 Drawing Sheets

(56) References Cited

U.S. PATENT DOCUMENTS

| | | |
|---|---|---|
| 6,629,340 B1 | 10/2003 | Dale et al. |
| 6,665,640 B1 | 12/2003 | Bennett et al. |
| 6,717,513 B1 | 4/2004 | Sandelman et al. |
| 6,947,885 B2 | 9/2005 | Bangalore et al. |
| 6,958,746 B1 | 10/2005 | Anderson et al. |
| 7,043,420 B2 | 5/2006 | Ratnaparkhi |
| 7,062,483 B2 | 6/2006 | Ferrari et al. |
| 7,167,824 B2 | 1/2007 | Kallulli |
| 7,231,341 B2 | 6/2007 | Bangalore et al. |
| 7,238,313 B2 | 7/2007 | Ferencz et al. |
| 7,305,336 B2 | 12/2007 | Polanyi et al. |
| 7,310,969 B2 | 12/2007 | Dale |
| 7,346,493 B2 | 3/2008 | Ringger et al. |
| 7,418,447 B2 | 8/2008 | Caldwell et al. |
| 7,424,363 B2 | 9/2008 | Cheng et al. |
| 7,444,287 B2 | 10/2008 | Claudatos et al. |
| 7,493,253 B1 | 2/2009 | Ceusters |
| 7,496,621 B2 | 2/2009 | Pan et al. |
| 7,526,424 B2 | 4/2009 | Corston-Oliver et al. |
| 7,533,089 B2 | 5/2009 | Pan et al. |
| 7,562,005 B1 | 7/2009 | Bangalore et al. |
| 7,653,545 B1 | 1/2010 | Starkie |
| 7,657,424 B2 | 2/2010 | Bennett |
| 7,684,991 B2 | 3/2010 | Stohr et al. |
| 7,711,581 B2 | 5/2010 | Hood et al. |
| 7,783,486 B2 | 8/2010 | Rosser et al. |
| 7,809,552 B2 | 10/2010 | Pan et al. |
| 7,849,048 B2 | 12/2010 | Langseth et al. |
| 7,849,049 B2 | 12/2010 | Langseth et al. |
| 7,856,390 B2 | 12/2010 | Schiller |
| 7,873,509 B1 | 1/2011 | Budzinski |
| 7,921,091 B2 | 4/2011 | Cox et al. |
| 7,930,169 B2 | 4/2011 | Billerey-Mosier |
| 7,933,774 B1 | 4/2011 | Begeja et al. |
| 7,966,172 B2 | 6/2011 | Ruiz et al. |
| 7,966,369 B1 | 6/2011 | Briere et al. |
| 7,970,601 B2 | 6/2011 | Burmester et al. |
| 7,979,267 B2 | 7/2011 | Ruiz et al. |
| 8,015,006 B2 | 9/2011 | Kennewick et al. |
| 8,019,610 B2 | 9/2011 | Walker et al. |
| 8,024,331 B2 | 9/2011 | Calistri-Yeh et al. |
| 8,037,000 B2 | 10/2011 | Delmonico et al. |
| 8,082,144 B1 | 12/2011 | Brown et al. |
| 8,090,727 B2 | 1/2012 | Lachtarnik et al. |
| 8,117,261 B2 | 2/2012 | Briere et al. |
| 8,150,676 B1 | 4/2012 | Kaeser |
| 8,175,873 B2 | 5/2012 | Di Fabbrizio et al. |
| 8,180,647 B2 | 5/2012 | Walker et al. |
| 8,180,758 B1 | 5/2012 | Cornali |
| 8,204,751 B1 | 6/2012 | Di Fabbrizio et al. |
| 8,229,937 B2 | 7/2012 | Kiefer et al. |
| 8,355,903 B1 | 1/2013 | Birnbaum et al. |
| 8,374,848 B1 | 2/2013 | Birnbaum et al. |
| 8,425,325 B2 | 4/2013 | Hope |
| 8,457,950 B1 | 6/2013 | Gardner |
| 8,473,911 B1 | 6/2013 | Baxter |
| 8,494,944 B2 | 7/2013 | Schiller |
| 8,515,733 B2 | 8/2013 | Jansen |
| 8,515,737 B2 | 8/2013 | Allen |
| 8,521,512 B2 | 8/2013 | Gorman et al. |
| 8,548,814 B2 | 10/2013 | Manuel-Devadoss |
| 8,548,915 B2 | 10/2013 | Antebi et al. |
| 8,561,014 B2 | 10/2013 | Mengusoglu et al. |
| 8,566,090 B2 | 10/2013 | Di Fabbrizio et al. |
| 8,572,173 B2 | 10/2013 | Briere et al. |
| 8,589,148 B2 | 11/2013 | Atallah et al. |
| 8,589,172 B2 | 11/2013 | Alonso et al. |
| 8,616,896 B2 | 12/2013 | Lennox |
| 8,620,669 B2 | 12/2013 | Walker et al. |
| 8,626,613 B2 | 1/2014 | Dale et al. |
| 8,630,844 B1 | 1/2014 | Nichols et al. |
| 8,655,889 B2 | 2/2014 | Hua et al. |
| 8,660,545 B1 | 2/2014 | Redford et al. |
| 8,676,691 B2 | 3/2014 | Schiller |
| 8,688,434 B1 | 4/2014 | Birnbaum et al. |
| 8,689,176 B2 | 4/2014 | Bagheri et al. |
| 8,700,396 B1 | 4/2014 | Mengibar et al. |
| 8,711,732 B2 | 4/2014 | Johnson |
| 8,719,696 B2 | 5/2014 | Duncan et al. |
| 8,738,384 B1 | 5/2014 | Bansal et al. |
| 8,738,558 B2 | 5/2014 | Antebi et al. |
| 8,762,134 B2 | 5/2014 | Reiter |
| 8,762,133 B2 | 6/2014 | Reiter |
| 8,775,161 B1 | 7/2014 | Nichols et al. |
| 8,825,533 B2 | 9/2014 | Basson et al. |
| 8,843,363 B2 | 9/2014 | Birnbaum et al. |
| 8,849,670 B2 | 9/2014 | Di Cristo et al. |
| 8,886,520 B1 | 11/2014 | Nichols et al. |
| 8,892,417 B1 | 11/2014 | Nichols et al. |
| 8,892,419 B2 | 11/2014 | Lundberg et al. |
| 8,898,063 B1 | 11/2014 | Sykes et al. |
| 8,903,711 B2 | 12/2014 | Lundberg et al. |
| 8,903,718 B2 | 12/2014 | Akuwudike |
| 8,909,595 B2 | 12/2014 | Gandy et al. |
| 8,914,452 B2 | 12/2014 | Boston et al. |
| 8,924,330 B2 | 12/2014 | Antebi et al. |
| 8,930,178 B2 | 1/2015 | Pestian et al. |
| 8,930,305 B2 | 1/2015 | Namburu et al. |
| 8,935,769 B2 | 1/2015 | Hessler |
| 8,977,953 B1 | 3/2015 | Pierre et al. |
| 8,984,051 B2 | 3/2015 | Olsen et al. |
| 9,002,695 B2 | 4/2015 | Watanabe et al. |
| 9,002,869 B2 | 4/2015 | Riezler et al. |
| 9,015,730 B1 | 4/2015 | Allen et al. |
| 9,028,260 B2 | 5/2015 | Nanjiani et al. |
| 9,092,276 B2 | 7/2015 | Allen et al. |
| 9,104,720 B2 | 8/2015 | Rakshit et al. |
| 9,110,882 B2 | 8/2015 | Overell et al. |
| 9,110,977 B1 | 8/2015 | Pierre et al. |
| 9,111,534 B1 | 8/2015 | Sylvester et al. |
| 9,135,244 B2 | 9/2015 | Reiter |
| 9,135,662 B2 | 9/2015 | Evenhouse et al. |
| 9,146,904 B2 | 9/2015 | Allen |
| 9,164,982 B1 | 10/2015 | Kaeser |
| 9,173,005 B1 | 10/2015 | Redford et al. |
| 9,190,054 B1 | 11/2015 | Riley et al. |
| 9,208,147 B1 | 12/2015 | Nichols et al. |
| 9,229,927 B2 | 1/2016 | Wolfram et al. |
| 9,240,197 B2 | 1/2016 | Begeja et al. |
| 9,244,894 B1 | 1/2016 | Dale et al. |
| 9,251,134 B2 | 2/2016 | Birnbaum et al. |
| 9,251,143 B2 | 2/2016 | Bird et al. |
| 9,263,039 B2 | 2/2016 | Di Cristo et al. |
| 9,268,770 B1 | 2/2016 | Kursun |
| 9,323,743 B2 | 4/2016 | Reiter |
| 9,396,181 B1 | 7/2016 | Sripada et al. |
| 9,405,448 B2 | 8/2016 | Reiter |
| 9,600,471 B2 | 3/2017 | Bradshaw et al. |
| 9,640,045 B2 | 5/2017 | Reiter |
| 9,990,360 B2 | 6/2018 | Sripada |
| 10,026,274 B2 | 7/2018 | Reiter |
| 2002/0026306 A1 | 2/2002 | Bangalore et al. |
| 2002/0143742 A1 | 10/2002 | Nonomura et al. |
| 2003/0131315 A1 | 7/2003 | Escher |
| 2003/0182102 A1 | 9/2003 | Corston-Oliver et al. |
| 2003/0195740 A1 | 10/2003 | Tokuda et al. |
| 2003/0212545 A1 | 11/2003 | Kallulli |
| 2004/0044515 A1 | 3/2004 | Metcalf et al. |
| 2004/0246120 A1 | 12/2004 | Benner et al. |
| 2005/0039107 A1 | 2/2005 | Hander et al. |
| 2005/0108001 A1 | 5/2005 | Aarskog |
| 2005/0228635 A1 | 10/2005 | Araki et al. |
| 2005/0256703 A1 | 11/2005 | Markel |
| 2006/0020886 A1 | 1/2006 | Agrawal et al. |
| 2006/0020916 A1 | 1/2006 | Allison et al. |
| 2006/0085414 A1 | 4/2006 | Chai et al. |
| 2006/0085667 A1 | 4/2006 | Kubota et al. |
| 2006/0136196 A1 | 6/2006 | Brun et al. |
| 2006/0178868 A1 | 8/2006 | Billerey-Mosier |
| 2006/0184888 A1 | 8/2006 | Bala |
| 2006/0224638 A1 | 10/2006 | Wald et al. |
| 2006/0242563 A1 | 10/2006 | Liu et al. |
| 2006/0259293 A1 | 11/2006 | Orwant |
| 2007/0038643 A1 | 2/2007 | Epstein |

(56) References Cited

U.S. PATENT DOCUMENTS

| | | |
|---|---|---|
| 2007/0078655 A1 | 4/2007 | Semkow et al. |
| 2007/0106628 A1 | 5/2007 | Adjali et al. |
| 2007/0129942 A1 | 6/2007 | Ban et al. |
| 2007/0143099 A1 | 6/2007 | Balchandran et al. |
| 2007/0150806 A1 | 6/2007 | Hartmann |
| 2007/0156677 A1 | 7/2007 | Szabo |
| 2007/0169021 A1 | 7/2007 | Huynh et al. |
| 2007/0219773 A1 | 9/2007 | Roux et al. |
| 2008/0221865 A1 | 9/2008 | Wellmann |
| 2008/0221870 A1 | 9/2008 | Attardi et al. |
| 2008/0281781 A1 | 11/2008 | Zhao et al. |
| 2008/0312954 A1 | 12/2008 | Ullrich et al. |
| 2009/0076799 A1 | 3/2009 | Crouch et al. |
| 2009/0089100 A1 | 4/2009 | Nenov et al. |
| 2009/0089126 A1 | 4/2009 | Odubiyi |
| 2009/0111486 A1 | 4/2009 | Burstrom |
| 2009/0138258 A1 | 5/2009 | Neale |
| 2009/0144609 A1 | 6/2009 | Liang et al. |
| 2009/0156229 A1 | 6/2009 | Hein et al. |
| 2009/0177929 A1 | 7/2009 | Sijelmassi |
| 2009/0182549 A1 | 7/2009 | Anisimovich et al. |
| 2009/0198496 A1 | 8/2009 | Denecke |
| 2009/0281839 A1 | 11/2009 | Lynn et al. |
| 2009/0286514 A1 | 11/2009 | Lichorowic et al. |
| 2009/0287567 A1 | 11/2009 | Penberthy et al. |
| 2010/0146491 A1 | 6/2010 | Hirano et al. |
| 2010/0153095 A1 | 6/2010 | Yang et al. |
| 2010/0153105 A1 | 6/2010 | Di Fabbrizio et al. |
| 2010/0174545 A1 | 7/2010 | Otani |
| 2010/0191658 A1 | 7/2010 | Kannan et al. |
| 2010/0203970 A1 | 8/2010 | Hope |
| 2010/0210379 A1 | 8/2010 | Shelley |
| 2010/0241421 A1 | 9/2010 | Funakoshi |
| 2010/0325608 A1 | 12/2010 | Radigan |
| 2010/0332235 A1 | 12/2010 | David |
| 2011/0010164 A1 | 1/2011 | Williams |
| 2011/0035210 A1 | 2/2011 | Rosenfeld et al. |
| 2011/0055687 A1 | 3/2011 | Bhandar et al. |
| 2011/0068929 A1 | 3/2011 | Franz et al. |
| 2011/0087486 A1 | 4/2011 | Schiller |
| 2011/0160986 A1 | 6/2011 | Wu et al. |
| 2011/0179006 A1 | 7/2011 | Cox et al. |
| 2011/0184959 A1 | 7/2011 | Maxwell, III et al. |
| 2011/0218822 A1 | 9/2011 | Buisman et al. |
| 2011/0225185 A1 | 9/2011 | Gupta |
| 2011/0257839 A1 | 10/2011 | Mukherjee |
| 2011/0307435 A1 | 12/2011 | Overell et al. |
| 2011/0313757 A1 | 12/2011 | Hoover et al. |
| 2011/0314060 A1 | 12/2011 | Sinha et al. |
| 2012/0078888 A1 | 3/2012 | Brown et al. |
| 2012/0084027 A1 | 4/2012 | Caine |
| 2012/0131008 A1 | 5/2012 | Ahn et al. |
| 2012/0136649 A1 | 5/2012 | Freising et al. |
| 2012/0158089 A1 | 6/2012 | Bocek et al. |
| 2012/0173475 A1 | 7/2012 | Ash et al. |
| 2012/0232919 A1 | 9/2012 | Wilson et al. |
| 2012/0290289 A1 | 11/2012 | Manera et al. |
| 2012/0290310 A1 | 11/2012 | Watson |
| 2012/0310990 A1 | 12/2012 | Viegas et al. |
| 2013/0013290 A1 | 1/2013 | Funakoshi et al. |
| 2013/0030810 A1 | 1/2013 | Kopparapu et al. |
| 2013/0041921 A1 | 2/2013 | Cooper et al. |
| 2013/0066873 A1 | 3/2013 | Salvetti et al. |
| 2013/0095864 A1 | 4/2013 | Marovets |
| 2013/0138428 A1 | 5/2013 | Chandramouli et al. |
| 2013/0144606 A1 | 6/2013 | Birnbaum et al. |
| 2013/0145242 A1 | 6/2013 | Birnbaum et al. |
| 2013/0151238 A1 | 6/2013 | Beaurpere et al. |
| 2013/0174026 A1 | 7/2013 | Locke |
| 2013/0185050 A1 | 7/2013 | Bird et al. |
| 2013/0185056 A1 | 7/2013 | Ingram et al. |
| 2013/0205195 A1 | 8/2013 | Dekhil et al. |
| 2013/0211855 A1 | 8/2013 | Eberle et al. |
| 2013/0238329 A1 | 9/2013 | Casella dos Santos |
| 2013/0238330 A1 | 9/2013 | Casella dos Santos |
| 2013/0238987 A1 | 9/2013 | Lutwyche |
| 2013/0251233 A1 | 9/2013 | Yang et al. |
| 2013/0268263 A1 | 10/2013 | Park et al. |
| 2013/0293363 A1 | 11/2013 | Plymouth et al. |
| 2013/0311201 A1 | 11/2013 | Chatfield et al. |
| 2014/0019531 A1 | 1/2014 | Czajka et al. |
| 2014/0025371 A1 | 1/2014 | Min |
| 2014/0039878 A1 | 2/2014 | Wasson |
| 2014/0052696 A1 | 2/2014 | Soroushian |
| 2014/0062712 A1 | 3/2014 | Reiter |
| 2014/0067377 A1 | 3/2014 | Reiter |
| 2014/0072947 A1 | 3/2014 | Boguraev et al. |
| 2014/0072948 A1 | 3/2014 | Boguraev et al. |
| 2014/0089212 A1 | 3/2014 | Sbodio |
| 2014/0100846 A1 | 4/2014 | Haine et al. |
| 2014/0100901 A1 | 4/2014 | Haine et al. |
| 2014/0100923 A1 | 4/2014 | Strezo et al. |
| 2014/0143720 A1 | 5/2014 | Dimarco et al. |
| 2014/0149107 A1 | 5/2014 | Schilder |
| 2014/0164303 A1 | 6/2014 | Bagchi et al. |
| 2014/0164304 A1 | 6/2014 | Bagchi et al. |
| 2014/0188477 A1 | 7/2014 | Zhang |
| 2014/0278358 A1 | 9/2014 | Byron et al. |
| 2014/0281935 A1 | 9/2014 | Byron et al. |
| 2014/0281951 A1 | 9/2014 | Megiddo et al. |
| 2014/0297268 A1 | 10/2014 | Govrin et al. |
| 2014/0316768 A1 | 10/2014 | Khandekar |
| 2014/0328570 A1 | 11/2014 | Cheng et al. |
| 2014/0358964 A1 | 12/2014 | Woods et al. |
| 2014/0375466 A1 | 12/2014 | Reiter |
| 2014/0379322 A1 | 12/2014 | Koutrika et al. |
| 2014/0379378 A1 | 12/2014 | Cohen-Solal et al. |
| 2015/0006437 A1 | 1/2015 | Byron et al. |
| 2015/0032443 A1 | 1/2015 | Karov et al. |
| 2015/0081299 A1 | 3/2015 | Jasinschi et al. |
| 2015/0081307 A1 | 3/2015 | Cederstrom et al. |
| 2015/0081321 A1 | 3/2015 | Jain |
| 2015/0095015 A1 | 4/2015 | Lani et al. |
| 2015/0106078 A1* | 4/2015 | Chang ............... G06F 17/30705 704/9 |
| 2015/0106307 A1 | 4/2015 | Antebi et al. |
| 2015/0142418 A1 | 5/2015 | Byron et al. |
| 2015/0142421 A1 | 5/2015 | Buurman et al. |
| 2015/0154359 A1 | 6/2015 | Harris et al. |
| 2015/0163358 A1 | 6/2015 | Klemm et al. |
| 2015/0169522 A1 | 6/2015 | Logan et al. |
| 2015/0169548 A1 | 6/2015 | Reiter |
| 2015/0169659 A1 | 6/2015 | Lee et al. |
| 2015/0169720 A1 | 6/2015 | Byron et al. |
| 2015/0169737 A1 | 6/2015 | Bryon et al. |
| 2015/0179082 A1 | 6/2015 | Byron et al. |
| 2015/0227508 A1 | 8/2015 | Howald et al. |
| 2015/0242384 A1 | 8/2015 | Reiter |
| 2015/0261744 A1 | 9/2015 | Suenbuel et al. |
| 2015/0261836 A1 | 9/2015 | Madhani et al. |
| 2015/0279348 A1 | 10/2015 | Cao et al. |
| 2015/0310013 A1 | 10/2015 | Allen et al. |
| 2015/0310112 A1 | 10/2015 | Allen et al. |
| 2015/0310861 A1 | 10/2015 | Waltermann et al. |
| 2015/0324343 A1 | 11/2015 | Carter et al. |
| 2015/0324347 A1 | 11/2015 | Bradshaw et al. |
| 2015/0324351 A1 | 11/2015 | Sripada et al. |
| 2015/0324374 A1 | 11/2015 | Sripada et al. |
| 2015/0324413 A1 | 11/2015 | Gubin et al. |
| 2015/0325000 A1 | 11/2015 | Sripada |
| 2015/0326622 A1 | 11/2015 | Carter et al. |
| 2015/0331845 A1 | 11/2015 | Guggilla et al. |
| 2015/0331846 A1 | 11/2015 | Guggilla et al. |
| 2015/0332670 A1 | 11/2015 | Akbacak et al. |
| 2015/0347400 A1 | 12/2015 | Sripada |
| 2015/0356127 A1 | 12/2015 | Pierre et al. |
| 2015/0363363 A1 | 12/2015 | Bohra et al. |
| 2015/0363364 A1 | 12/2015 | Sripada |
| 2015/0363382 A1 | 12/2015 | Bohra et al. |
| 2015/0363390 A1 | 12/2015 | Mungi et al. |
| 2015/0363391 A1 | 12/2015 | Mungi et al. |
| 2015/0371651 A1 | 12/2015 | Aharoni et al. |
| 2015/0378987 A1* | 12/2015 | Sekar ............... G06F 17/3061 704/9 |

(56) References Cited

U.S. PATENT DOCUMENTS

| | | | |
|---|---|---|---|
| 2016/0019200 A1 | 1/2016 | Allen | |
| 2016/0027125 A1 | 1/2016 | Bryce | |
| 2016/0055150 A1 | 2/2016 | Bird et al. | |
| 2016/0132484 A1* | 5/2016 | Nauze | G06F 17/2735 704/9 |
| 2016/0132489 A1 | 5/2016 | Reiter | |
| 2016/0140090 A1 | 5/2016 | Dale et al. | |
| 2016/0232152 A1 | 8/2016 | Mahamood | |
| 2016/0328385 A1 | 11/2016 | Reiter | |
| 2017/0018107 A1 | 1/2017 | Reiter | |
| 2017/0075884 A1 | 3/2017 | Sripada et al. | |

FOREIGN PATENT DOCUMENTS

| | | | |
|---|---|---|---|
| AU | 2013201755 A1 | 9/2013 | |
| AU | 2013338351 A1 | 5/2015 | |
| CA | 2577721 C | 3/2006 | |
| CA | 2826116 C | 3/2006 | |
| CN | 103999081 A | 8/2014 | |
| CN | 104182059 A | 12/2014 | |
| CN | 104881320 A | 9/2015 | |
| EP | 1336955 B1 | 8/2003 | |
| EP | 2707809 A1 | 3/2014 | |
| EP | 2750759 A1 | 7/2014 | |
| EP | 2849103 A2 | 3/2015 | |
| GB | 2518192 A | 3/2015 | |
| JP | S61221873 A | 10/1986 | |
| JP | 2004021791 A | 1/2004 | |
| JP | 2014165766 A | 9/2014 | |
| WO | WO 2000/074394 A2 | 12/2000 | |
| WO | WO 2002/031628 A2 | 4/2002 | |
| WO | WO 2002/031628 A3 | 4/2002 | |
| WO | WO 2002/073449 A1 | 9/2002 | |
| WO | WO 2002/073531 A1 | 9/2002 | |
| WO | WO 2006/010044 A2 | 1/2006 | |
| WO | WO 2007/041221 A1 | 4/2007 | |
| WO | WO 2009/014465 A2 | 1/2009 | |
| WO | WO 2010/049925 A2 | 5/2010 | |
| WO | WO 2010/051404 A1 | 5/2010 | |
| WO | WO 2012/071571 A2 | 5/2012 | |
| WO | WO 2013/009613 A1 | 1/2013 | |
| WO | WO 2013/042115 A2 | 3/2013 | |
| WO | WO 2013/042116 A1 | 3/2013 | |
| WO | WO 2013/177280 A1 | 11/2013 | |
| WO | WO 2014/035402 A1 | 3/2014 | |
| WO | WO 2014/098560 A2 | 6/2014 | |
| WO | WO 2014/140977 A1 | 9/2014 | |
| WO | WO 2014/187076 A1 | 11/2014 | |
| WO | WO 2015/028844 A1 | 3/2015 | |
| WO | WO 2015/113301 A1 | 8/2015 | |
| WO | WO 2015/148278 A1 | 10/2015 | |
| WO | WO 2015/159133 A1 | 10/2015 | |
| WO | WO 2015/164253 A1 | 10/2015 | |
| WO | WO 2015/175338 A1 | 11/2015 | |
| WO | WO 2016/004266 A2 | 1/2016 | |

OTHER PUBLICATIONS

U.S. Appl. No. 14/027,684, filed Sep. 16, 2013; In re: Sripada et al., entitled *Method, Apparatus, and Computer Program Product for User-Directed Reporting.*

U.S. Appl. No. 14/914,461, filed Feb. 25, 2016; In re: Reiter et al., entitled *Text Generation From Correlated Alerts.*

U.S. Appl. No. 15/022,420, filed Mar. 16, 2016; In re: Mahamood, entitled *Method and Apparatus for Document Planning.*

U.S. Appl. No. 15/074,425, filed Mar. 18, 2016; In re: Reiter, entitled *Method and Apparatus for Situational Analysis Text Generation.*

U.S. Appl. No. 15/093,337, filed Apr. 7, 2016; In re: Reiter, entitled *Method and Apparatus for Referring Expression Generation.*

U.S. Appl. No. 15/093,365, filed Apr. 7, 2016; In re: Logan et al., entitled *Method and Apparatus for Updating a Previously Generated Text.*

Reiter, E. et al., *Building Natural Language Generation Systems*, Cambridge University Press (2000) 248 pages.

Office Action for U.S. Appl. No. 15/022,420 dated Sep. 28, 2018.

Applicant Initiated Interview Summary for U.S. Appl. No. 14/822,349 dated Feb. 13, 2018.

Notice of Allowance for U.S. Appl. No. 14/634,074 dated Jun. 30, 2015.

Office Action for U.S. Appl. No. 14/634,074 dated Apr. 17, 2015.

Office Action for U.S. Appl. No. 14/822,349 dated Jan. 20, 2017.

Office Action for U.S. Appl. No. 14/822,349 dated Jun. 27, 2018.

Office Action for U.S. Appl. No. 14/822,349 dated Nov. 13, 2017.

Office Action for U.S. Appl. No. 14/822,349 dated Sep. 2, 2016.

U.S. Appl. No. 14/634,074, entitled Method and Apparatus for Configurable Microplanning; In re: Reiter; filed Feb. 27, 2015.

U.S. Appl. No. 14/822,349; entitled Method and Apparatus for Configurable Microplanning; In re: Reiter, filed Aug. 10, 2015.

Alawneh et al., "Pattern Recognition Techniques Applied to the Abstraction of Traces of Inter-Process Communication," Software Maintenance and Reengineering (CSMR), 2011 15th European Conference on Year: 2011, IEEE Conference Publications, pp. 211-220, (2011).

Andre et al., "From Visual Data to Multimedia Presentations," Grounding Representations: Integration of Sensory Information in Natural Language Processing, Artificial Intelligence and Neural networks, IEE Colloquium On, pp. 1-3, (1995).

Andre et al., "Natural Language Access to Visual Data: Dealing with Space and Movement," Report 63, German Research Center for Artificial Intelligence (DFKI) SFB 314, Project VITRA, pp. 1-21, (1989).

Barzilay et al.; "Aggregation via Set Partitioning for Natural Language Generation", Proceedings of the Human Language Technology Conference of the North American Chapter of the ACL; pp. 359-366; (2006).

Bhoedjang et al., "Optimizing Distributed Data Structures Using Application-Specific Network Interface Software," Parallel Processing, Proceedings; International Conference on Year: 1998, IEEE Conference Publications, pp. 485-492, (1998).

Cappozzo et al., "Surface-Marker Cluster Design Criteria for 3-D Bone Movement Reconstruction," IEEE Transactions on Biomedical Engineering, 44(12):1165-1174, (1997).

Chang-Jie et al., "Interactive Location-based Services Combined with Natural Language," International Conference on Wireless Communications, Networking and Mobile Computing, pp. 3015-3018, (2007).

Dalianis et al.; "Aggregation in Natural Language Generation;" Trends in Natural Language Generation, an Artificial Intelligence Perspective; pp. 88-105; (1993).

Dragon et al., "Multi-Scale Clustering of Frame-to-Frame Correspondences for Motion Segmentation," Computer Vision ECCV, Springer Berlin Heidelberg, pp. 445-458, (2012).

Gatt et al.,"From Data to Text in the Neonatal Intensive Care Unit: Using NLG Technology for Decision Support and Information Management," AI Communication, pp. 153-186, (2009).

Gorelov et al., "Search Optimization in Semistructured Databases Using Hierarchy of Document Schemas," Programming and Computer Software, 31(6):321-331, (2005).

Guoqiang et al., "The Research on Interactive short Message Response," Workshop on Intelligent Information Technology Application, IEEE Conference Publications pp. 206-209, (2007).

Herzog et al., "Combining Alternatives in the Multimedia Presentation of Decision Support Information for Real-Time Control," IFIP, 15 pages,(1998).

Kottke et al., "Motion Estimation Via Cluster Matching," 8180 IEEE Transactions on Pattern Analysis and Machine Intelligence, 16(11):1128-1132, (1994).

Kukich, "Knowledge-Based Report Generation: A Knowledge-Engineering Approach to Natural Language Report Generation," Dissertation to the Interdisciplinary Department of Information Science, University of Pittsburg, 260 pages, (1983).

Leonov et al., "Construction of an Optimal Relational Schema for Storing XML Documents in an RDBMS Without Using DTD/XML Schema," Programming and Computer Software, 30(6):323-336, (2004).

(56) References Cited

OTHER PUBLICATIONS

Perry et al., "Automatic Realignment of Data Structures to Improve MPI Performance," Networks (ICN), Ninth International Conference on Year: 2010, IEEE Conference Publications, pp. 42-47, (2010).
Premchaiswadi et al., "Enhancing Learning Systems by using Virtual Interactive Classrooms and Web-based Collaborative Work," Education Engineering (EDUCON) IEEE Conference Publications, pp. 1531-1537, (2010).
Quinlan, "Induction of Decision Trees," Machine Learning, Kluwer Academic Publishers, 1(1):81-106, (1986).
Radev et al.,"Generating Natural Language Summaries from Multiple On-Line Sources," Association of Computational Linguistics, 24(3):469-500, (1998).
Reiter et al., "Building Applied Natural Language Generation Systems," Natural Language Engineering 1 (1), 31 pages, (1995).
Reiter, "An Architecture for Data-to-Text Systems," Proceedings of ENLG-2007, pp. 97-104, (2007).
Reiter, "Chapter 4: Document Planning (early draft), Building Natural Language Generation Systems," pp. 73-113, (2005). [Retrieved from the Internet Nov. 2, 2017: <http://www.ling.helsinki.fi/~gwilcock/Tartu-2003/ReiterDale/4-DocumentPlanning.pdf>].
Seki, "XML Transformation-based three-stage pipelined Natural Language Generation System," Proc. of 6th NLP Pacific Rim Symposium (NLPRS 2001), pp. 767-768, (2001). [Retrieved from the Internet Nov. 2, 2017: <http://www.afnlp.org/archives/nlprs2001/pdf/exh-04-01.pdf>].
Shaw, "Clause Aggregation Using Linguistic Knowledge;" Proceedings of IWNLG, pp. 138-147, (1998). Retrieved from <http://acl.ldc.upenn.edu/W/W98/W98-1415.pdf>.
Spillner et al., "Algorithms for Dispersed Processing," Utility and Cloud Computing (UC), 204 IEEE/ACM 7th International Conference on Year: 2014, IEEE Conferenced Publications, pp. 914-921, (2014).
Takeuchi et al., "Human Prosocial Response to Emotive Facial Expression of Interactive Agent," The 15th IEEE International Symposium on Robot and Human Interactive Communication, pp. 680-685, (2006).
Voelz et al., "Rocco: A RoboCup Soccer Commentator System," German Research Center for Artificial Intelligence DFKI GmbH, 11 pages, (1999).
Wilcock, "An Overview of Shallow XML-Based Natural Language Generation," Baltic HLT, pp. 67-78, (2005). [Retrieved from the Internet Nov. 2, 2017: <https://www.ling.helsinki.fi/~gwilcock/Pubs/2005/BalticHLT-05.pdf>].
Yu et al., "Choosing the Content of Textual Summaries of Large Time-Series Data Sets," Natural Language Engineering, 13:1-28, (2007).
International Preliminary Report on Patentability for Application No. PCT/IB2012/056513 dated May 19, 2015.
International Preliminary Report on Patentability for Application No. PCT/IB2012/056514 dated May 19, 2015.
International Preliminary Report on Patentability for Application No. PCT/IB2012/057773 dated Jun. 30, 2015.
International Preliminary Report on Patentability for Application No. PCT/IB2012/057774 dated Jun. 30, 2015.
International Preliminary Report on Patentability for Application No. PCT/IB2013/050375 dated Jul. 21, 2015.
International Preliminary Report on Patentability for Application No. PCT/IB2013/058131 dated May 5, 2015.
International Preliminary Report on Patentability for Application No. PCT/IB2014/060846 dated Oct. 18, 2016.
International Preliminary Report on Patentability for Application No. PCT/US2012/053115 dated Mar. 3, 2015.
International Preliminary Report on Patentability for Application No. PCT/US2012/053127 dated Mar. 3, 2015.
International Preliminary Report on Patentability for Application No. PCT/US2012/053128 dated Mar. 3, 2015.
International Preliminary Report on Patentability for Application No. PCT/US2012/053156 dated Mar. 3, 2015.
International Preliminary Report on Patentability for Application No. PCT/US2012/053183 dated Mar. 3, 2015.
International Preliminary Report on Patentability for Application No. PCT/US2012/061051 dated Mar. 3, 2015.
International Preliminary Report on Patentability for Application No. PCT/US2012/063343 dated May 5, 2015.
International Search Report and Written Opinion for Application No. PCT/IB2012/056513 dated Jun. 26, 2013.
International Search Report and Written Opinion for Application No. PCT/IB2012/056514 dated Jun. 26, 2013.
International Search Report and Written Opinion for Application No. PCT/IB2012/057773 dated Jul. 1, 2013.
International Search Report and Written Opinion for Application No. PCT/IB2012/057774 dated Sep. 20, 2013.
International Search Report and Written Opinion for Application No. PCT/IB2013/050375 dated May 7, 2013.
International Search Report and Written Opinion for Application No. PCT/IB2013/058131 dated Jul. 3, 2014.
International Search Report and Written Opinion for Application No. PCT/IB2014/060846 dated Feb. 4, 2015.
International Search Report and Written Opinion for Application No. PCT/US2012/053115 dated Jul. 24, 2013.
International Search Report and Written Opinion for Application No. PCT/US2012/053127 dated Jul. 24, 2013.
International Search Report and Written Opinion for Application No. PCT/US2012/053128 dated Jun. 27, 2013.
International Search Report and Written Opinion for Application No. PCT/US2012/053156 dated Sep. 26, 2013.
International Search Report and Written Opinion for Application No. PCT/US2012/053183 dated Jun. 4, 2013.
International Search Report and Written Opinion for Application No. PCT/US2012/061051 dated Jul. 24, 2013.
International Search Report and Written Opinion for Application No. PCT/US2012/063343; dated Jan. 15, 2014.
Notice of Allowance for U.S. Appl. No. 14/023,023 dated Apr. 11, 2014.
Notice of Allowance for U.S. Appl. No. 14/023,056 dated Apr. 29, 2014.
Notice of Allowance for U.S. Appl. No. 14/027,684 dated Mar. 21, 2016.
Notice of Allowance for U.S. Appl. No. 14/027,775 dated Aug. 12, 2015.
Notice of Allowance for U.S. Appl. No. 14/027,775 dated Sep. 10, 2015.
Notice of Allowance for U.S. Appl. No. 14/311,806 dated Dec. 28, 2016.
Notice of Allowance for U.S. Appl. No. 14/311,998 dated Dec. 22, 2015.
Notice of Allowance for U.S. Appl. No. 14/311,998 dated Jan. 21, 2016.
Notice of Allowance for U.S. Appl. No. 14/634,035 dated Mar. 30, 2016.
Notice of Allowance for U.S. Appl. No. 15/421,921 dated Mar. 14, 2018.
Office Action for U.S. Appl. No. 14/023,023 dated Mar. 4, 2014.
Office Action for U.S. Appl. No. 14/023,056 dated Nov. 21, 2013.
Office Action for U.S. Appl. No. 14/027,684 dated Oct. 6, 2015.
Office Action for U.S. Appl. No. 14/027,775 dated Jul. 13, 2015.
Office Action for U.S. Appl. No. 14/311,806 dated Jun. 10, 2016.
Office Action for U.S. Appl. No. 14/311,998 dated Feb. 20, 2015.
Office Action for U.S. Appl. No. 14/311,998 dated Oct. 7, 2015.
Office Action for U.S. Appl. No. 14/634,035 dated Aug. 28, 2015.
Office Action for U.S. Appl. No. 14/634,035 dated Dec. 10, 2015.
Office Action for U.S. Appl. No. 14/634,035 dated Mar. 30, 2016.
Office Action for U.S. Appl. No. 14/760,848 dated May 11, 2017.
Office Action for U.S. Appl. No. 14/961,222 dated Mar. 3, 2018.
Office Action for U.S. Appl. No. 15/022,420 dated Feb. 13, 2018.
Office Action for U.S. Appl. No. 15/022,420 dated May 18, 2017.
Office Action for U.S. Appl. No. 15/074,425 dated Feb. 26, 2018.
Office Action for U.S. Appl. No. 15/074,425 dated May 10, 2017.
Office Action for U.S. Appl. No. 15/186,927 dated Jul. 3, 2018.
Office Action for U.S. Appl. No. 15/186,927 dated May 1, 2017.
Office Action for U.S. Appl. No. 15/186,927 dated Nov. 17, 2017.

(56) References Cited

OTHER PUBLICATIONS

Office Action for U.S. Appl. No. 15/188,423 dated Oct. 23, 2017.
Office Action for U.S. Appl. No. 15/188,423 dated Jul. 20, 2018.
Office Action for U.S. Appl. No. 15/421,921 dated Sep. 27, 2017.
Statement in accordance with the Notice from the European patent Office dated Oct. 1, 2007 concerning business methods (OJ EPO Nov. 2007, 592-593, (XP002456414) 1 page.
U.S. Appl. No. 12/779,636; entitled "System and Method for Using Data to Automatically Generate a Narrative Story" filed May 13, 2010.
U.S. Appl. No. 13/186,308; entitled "Method and Apparatus for Triggering the Automatic Generation of Narratives" filed Jul. 19, 2011.
U.S. Appl. No. 13/186,329; entitled "Method and Apparatus for Triggering the Automatic Generation of Narratives" filed Jul. 19, 2011.
U.S. Appl. No. 13/186,337; entitled "Method and Apparatus for Triggering the Automatic Generation of Narratives" filed Jul. 19, 2011.
U.S. Appl. No. 13/186,346; entitled "Method and Apparatus for Triggering the Automatic Generation of Narratives" filed Jul. 19, 2011.
U.S. Appl. No. 13/464,635; entitled "Use of Tools and Abstraction in a Configurable and Portable System for Generating Narratives" filed May 4, 2012.
U.S. Appl. No. 13/464,675; entitled "Configurable and Portable System for Generating Narratives" filed May 4, 2012.
U.S. Appl. No. 13/464,716; entitled "Configurable and Portable System for Generating Narratives" filed May 4, 2012.
U.S. Appl. No. 14/023,023; entitled "Method and Apparatus for Alert Validation;" filed Sep. 10, 2013.
U.S. Appl. No. 14/023,056; entitled "Method and Apparatus for Situational Analysis Text Generation;" filed Sep. 10, 2013.
U.S. Appl. No. 14/027,775; entitled "Method and Apparatus for Interactive Reports;" filed Sep. 16, 2013.
U.S. Appl. No. 14/311,806; entitled Method and Apparatus for Alert Validation; In re: Reiter, filed Jun. 23, 2014.
U.S. Appl. No. 14/311,998, entitled Method and Apparatus for Situational Analysis Text Generation; In re: Reiter; filed Jun. 23, 2014.
U.S. Appl. No. 14/634,035, entitled Method and Apparatus for Annotating a Graphical Output; In re: Reiter; filed Feb. 27, 2015.
U.S. Appl. No. 14/760,848, entitled Method and Apparatus for Document Planning; In re: Sripada; filed Jul. 14, 2015.
U.S. Appl. No. 14/961,222, entitled Method and Apparatus for Interactive Reports; In re: Dale et al., filed Dec. 7, 2015.
U.S. Appl. No. 15/188,423, filed Jun. 21, 2016; In re: Reiter, entitled Method and Apparatus for Annotating a Graphical Output.
U.S. Appl. No. 15/421,921, filed Feb. 1, 2017; In re: Reiter, entitled Method and Apparatus for Alert Validation.
U.S. Appl. No. 15/186,927, filed Jun. 20, 2016; In re: Sripada, entitled Method, Apparatus, and Computer Program Product for User-Directed Reporting.
Buschmeier et al, "An alignment-capable microplanner for natural language generation," Proceedings of the 12th European Workshop on Natural Language Generation. Association for Computational Linguistics, pp. 82-89, (2009).
Paraboni, "Generating Referring Expressions: Making Referents Easy to Identify," In Computational Linguistics, 33(2):229-254, (2007).
Paraboni, "Generating references in hierarchical domains: the case of Document Deixis," University of Brighton PhD thesis, pp. 1-207, (2003).
Siddharthan et al., "Generating referrng expressions in open domains," In Proceedings of ACL 2004, pp. 1-8, (2004).
Theune, "Natural Language Generation for dialogue: system survey," Thesis , University of Twene, pp. 1-47, (2003).
Notice of Allowance for U.S. Appl. No. 14/634,119 dated Feb. 2, 2016.
Notice of Allowance for U.S. Appl. No. 14/961,222 dated Nov. 16, 2018.
Notice of Allowance for U.S. Appl. No. 15/186,927 dated Dec. 20, 2018.
Notice of Allowance for U.S. Appl. No. 15/188,423 dated Dec. 28, 2018.
Office Action for U.S. Appl. No. 14/634,119 dated Apr. 21, 2015.
Office Action for U.S. Appl. No. 14/634,119 dated Oct. 23, 2015.
Office Action for U.S. Appl. No. 14/760,848 dated Oct. 2, 2018.
Office Action for U.S. Appl. No. 15/074,425 dated Nov. 27, 2018.
Office Action for U.S. Appl. No. 15/093,337 dated Apr. 4, 2018.
Office Action for U.S. Appl. No. 15/093,337 dated Dec. 14, 2018.
Office Action for U.S. Appl. No. 15/093,337 dated Jun. 29, 2017.
Office Action for U.S. Appl. No. 15/188,423 dated Oct. 30, 2018.
Office Action for U.S. Appl. No. 16/009,006 dated Dec. 3, 2018.

* cited by examiner

METHOD AND APPARATUS FOR NATURAL LANGUAGE DOCUMENT ORCHESTRATOR

TECHNOLOGICAL FIELD

Embodiments of the present invention relate generally to natural language generation technologies and, more particularly, relate to a method, apparatus, and computer program product for orchestrating a document into natural language text.

BACKGROUND

In some examples, a natural language generation (NLG) system is configured to transform raw input data that is expressed in a non-linguistic format into a format that can be expressed linguistically, such as through the use of natural language. For example, raw input data may take the form of a value of a stock market index over time and, as such, the raw input data may include data that is suggestive of a time, a duration, a value and/or the like. Therefore, an NLG system may be configured to input the raw input data and output text that linguistically describes the value of the stock market index; for example, "Securities markets rose steadily through most of the morning, before sliding downhill late in the day."

Data that is input into a NLG system may be provided in, for example, a recurrent formal structure. The recurrent formal structure may comprise a plurality of individual fields and defined relationships between the plurality of individual fields. For example, the input data may be contained in a spreadsheet or database, presented in a tabulated log message or other defined structure, encoded in a 'knowledge representation' such as the resource description framework (RDF) triples that make up the Semantic Web and/or the like. In some examples, the data may include numerical content, symbolic content or the like. Symbolic content may include, but is not limited to, alphanumeric and other non-numeric character sequences in any character encoding, used to represent arbitrary elements of information. In some examples, the output of the NLG system is text in a natural language (e.g. English, Japanese or Swahili), but may also be in the form of synthesized speech.

BRIEF SUMMARY

Methods, apparatuses, and computer program products are described herein that are configured to be embodied as and/or performed by a natural language document orchestrator. In one example embodiment, a method comprises accessing a scripted input language file, wherein the scripted input language file comprises one or more document orchestration requests. The method of this embodiment may also include parsing the one or more document orchestration requests by a processor, wherein each document orchestration request comprises an identification of a document orchestration module of one or more document orchestration requests and formatted instructions for execution by the document orchestration module. The method of this embodiment may further include executing the one or more document orchestration requests by invoking the document orchestration module, passing the document orchestration module the formatted instructions, receiving a natural language output from the document orchestration module, and processing the natural language output to generate natural language text. The method of this embodiment may also further include, determining that all document orchestration requests of the parsed input language file have executed and outputting natural language text via an output text processor.

In one example embodiment an apparatus comprises at least one processor; and at least one memory including computer program code. In the apparatus of this embodiment, the at least one memory and the computer program code are configured to, with the at least one processor, cause the apparatus to at least access a scripted input language file, wherein the scripted input language file comprises one or more document orchestration requests. In the apparatus of this embodiment, the at least one memory and the computer program code are further configured to, with the at least one processor, cause the apparatus to parse the one or more document orchestration requests by a processor, wherein each document orchestration request comprises an identification of a document orchestration module of one or more document orchestration requests and formatted instructions for execution by the document orchestration module. In the apparatus of this embodiment, the at least one memory and the computer program code are configured to, with the at least one processor, cause the apparatus to execute the one or more document orchestration requests by invoking the document orchestration module, passing the document orchestration module the formatted instructions, receiving a natural language output from the document orchestration module, and processing the natural language output to generate natural language text. In the apparatus of this embodiment, the at least one memory and the computer program code are further configured to, with the at least one processor, cause the apparatus to determine that all document orchestration requests of the parsed input language file have executed and output natural language text via an output text processor.

In one example embodiment, a computer program product comprises at least one computer readable non-transitory memory medium having program code instructions stored thereon. In the computer program product of this embodiment, the program code instructions, when executed by an apparatus, cause the apparatus at least to access a scripted input language file, wherein the scripted input language file comprises one or more document orchestration requests. In the computer program product of this embodiment, the program code instructions, when executed by an apparatus, further cause the apparatus to parse the one or more document orchestration requests by a processor, wherein each document orchestration request comprises an identification of a document orchestration module of one or more document orchestration requests and formatted instructions for execution by the document orchestration module. In the computer program product of this embodiment, the program code instructions, when executed by an apparatus, further cause the apparatus to execute the one or more document orchestration requests by invoking the document orchestration module, passing the document orchestration module the formatted instructions, receiving a natural language output from the document orchestration module, and processing the natural language output to generate natural language text. In the computer program product of this embodiment, the program code instructions, when executed by an apparatus, further cause the apparatus to determine that all document orchestration requests of the parsed input language file have executed and output natural language text via an output text processor.

In one example embodiment, an apparatus includes means for accessing a scripted input language file, wherein the scripted input language file comprises one or more document orchestration requests. The apparatus of this embodiment may further include means for parsing the one or more document orchestration requests by a processor, wherein each document orchestration request comprises an identification of a document orchestration module of one or more document orchestration requests and formatted instructions for execution by the document orchestration module. The apparatus of this embodiment may also further include means for executing the one or more document orchestration requests by invoking the document orchestration module, passing the document orchestration module the formatted instructions, receiving a natural language output from the document orchestration module, and processing the natural language output to generate natural language text. The apparatus of this embodiment may also further include means for determining that all document orchestration requests of the parsed input language file have executed and outputting natural language text via an output text processor.

BRIEF DESCRIPTION OF THE DRAWINGS

Figure 1:
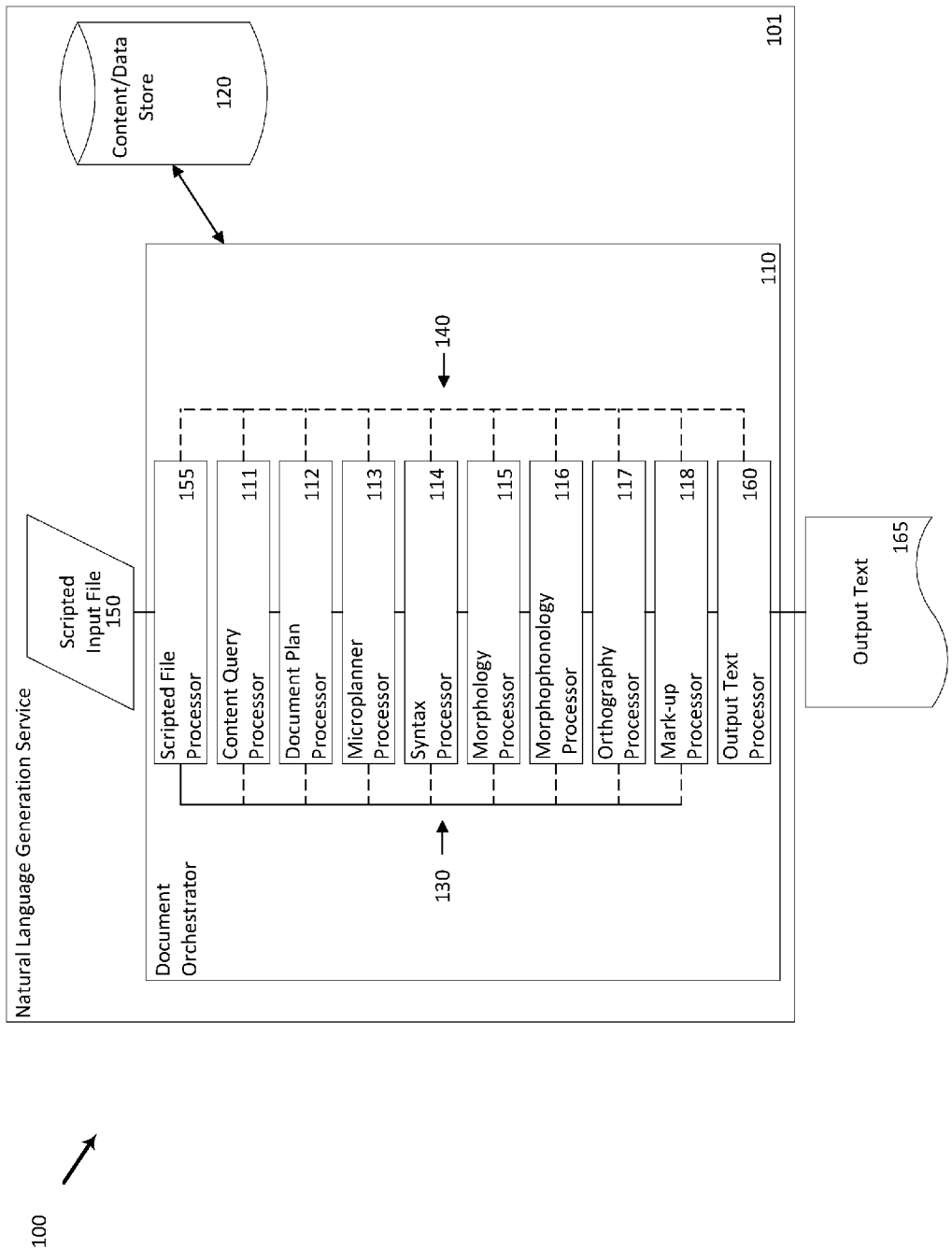
Figure 2:
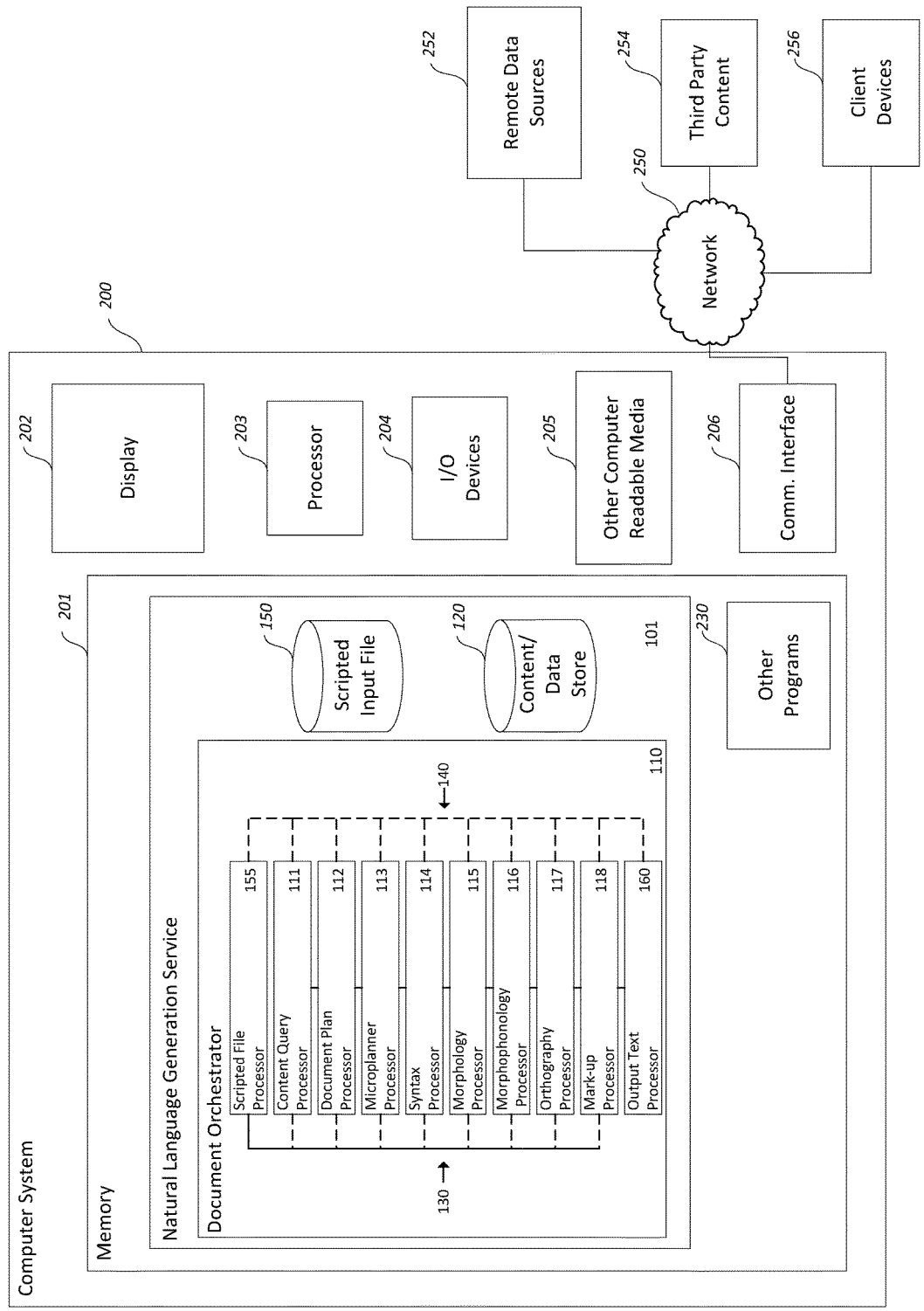
Figure 3:
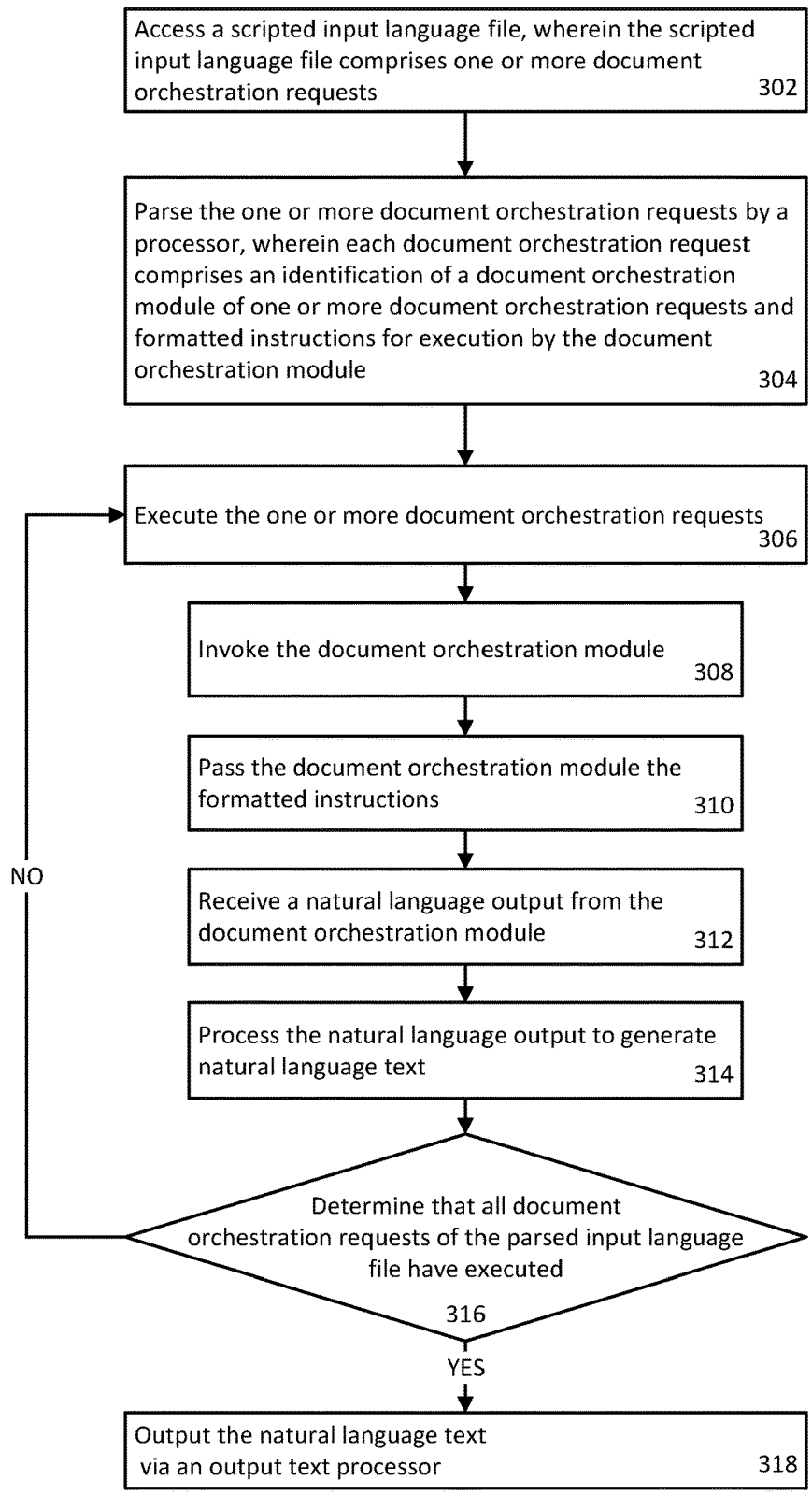
Figure 4:
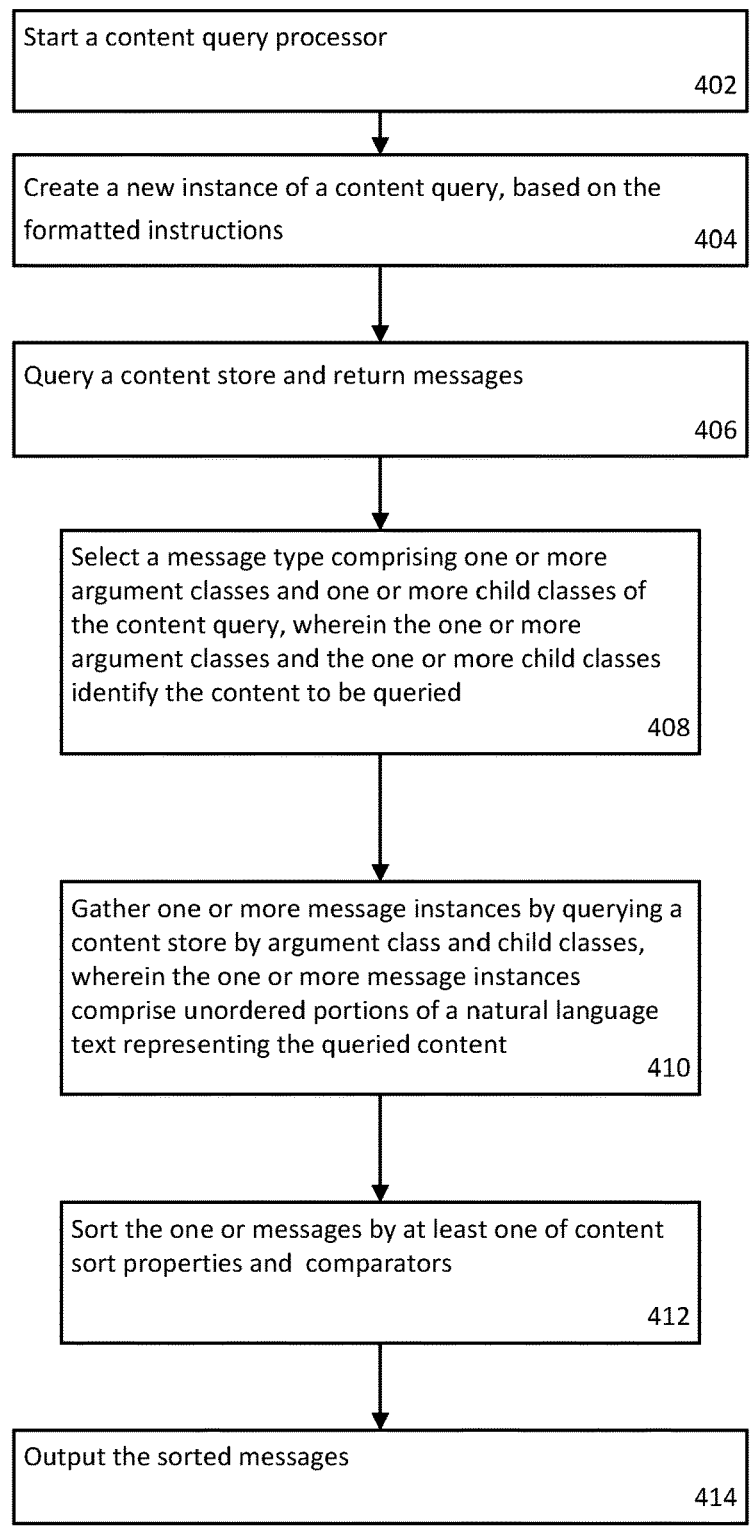
Figure 5:
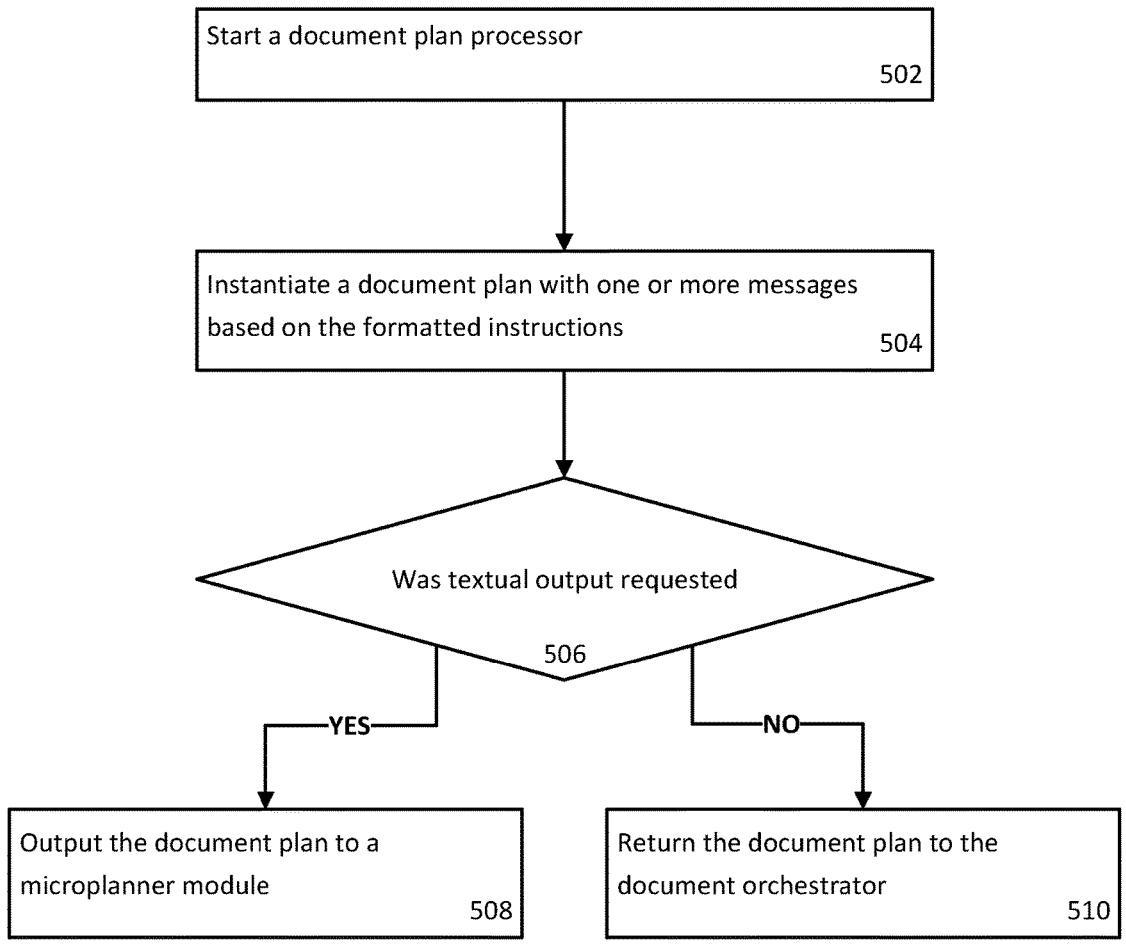
Figure 6:
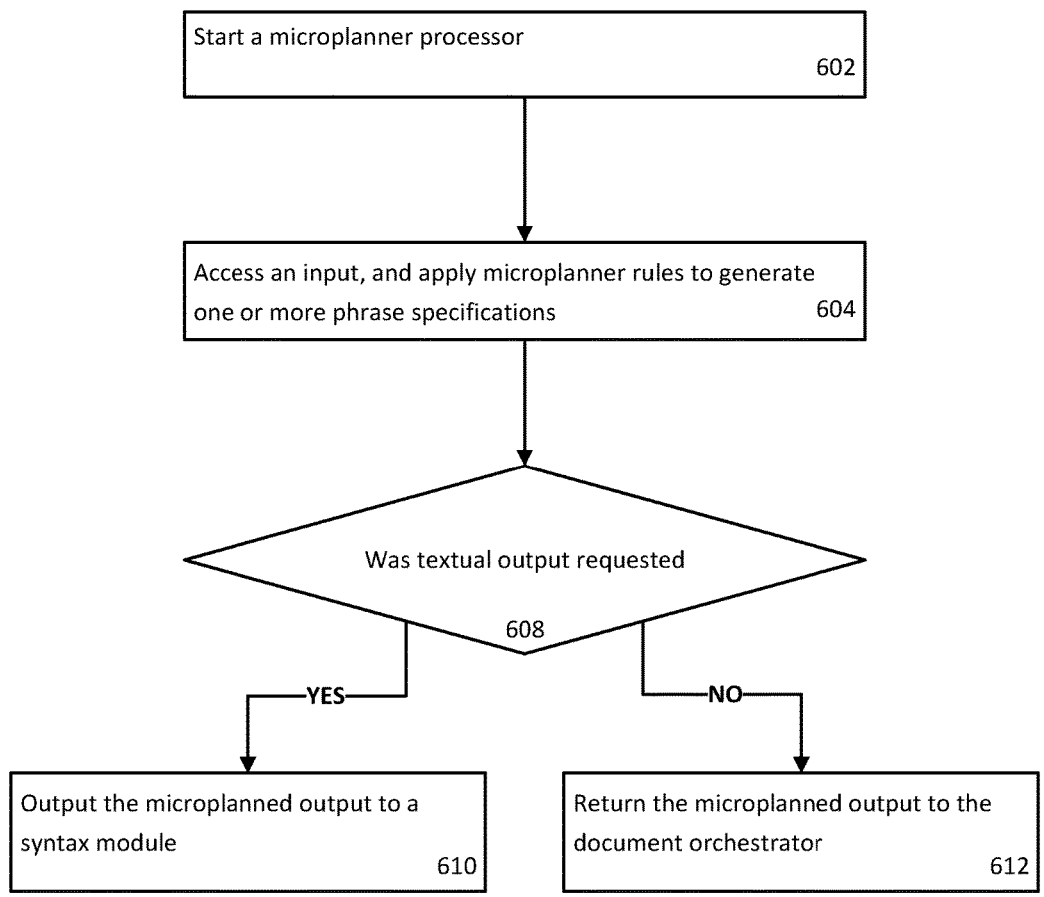
Figure 7:
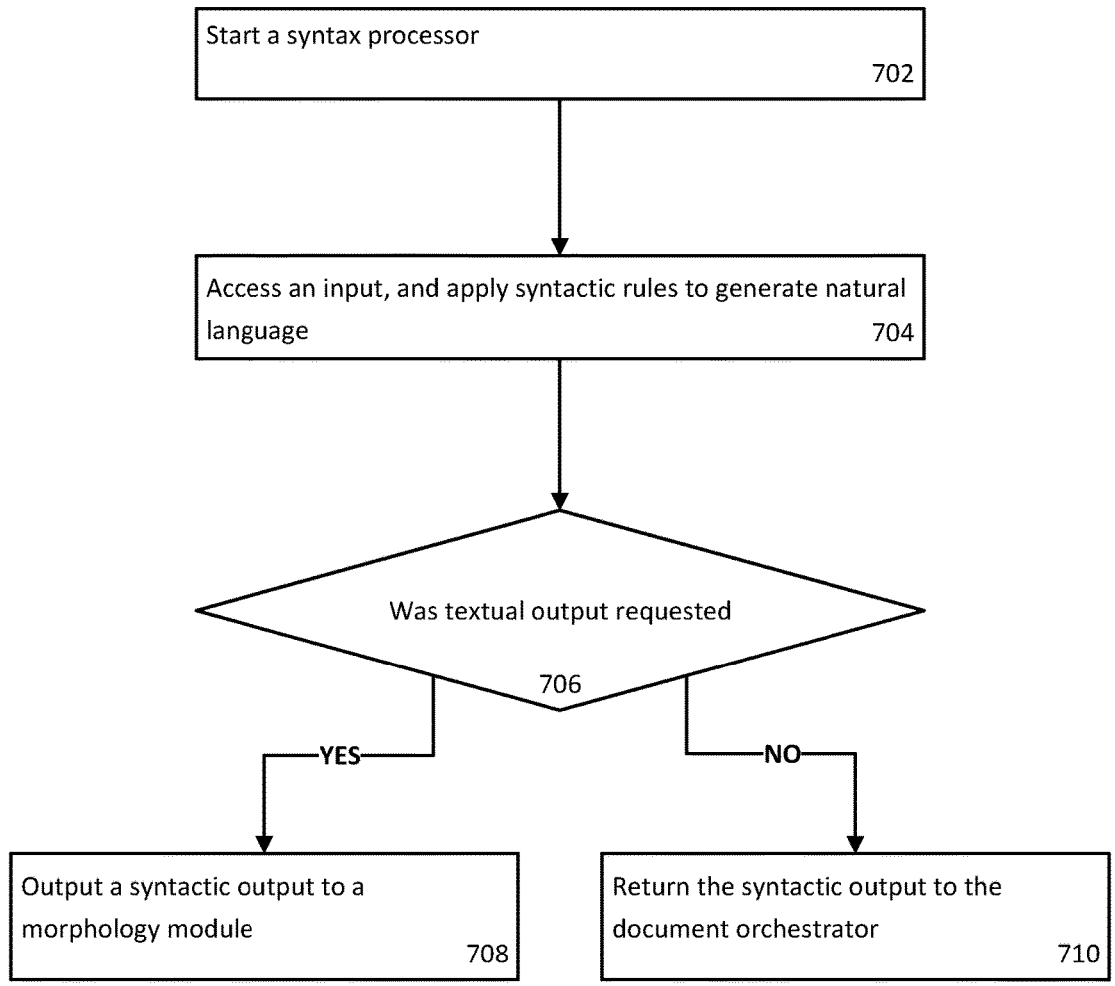
Figure 8:
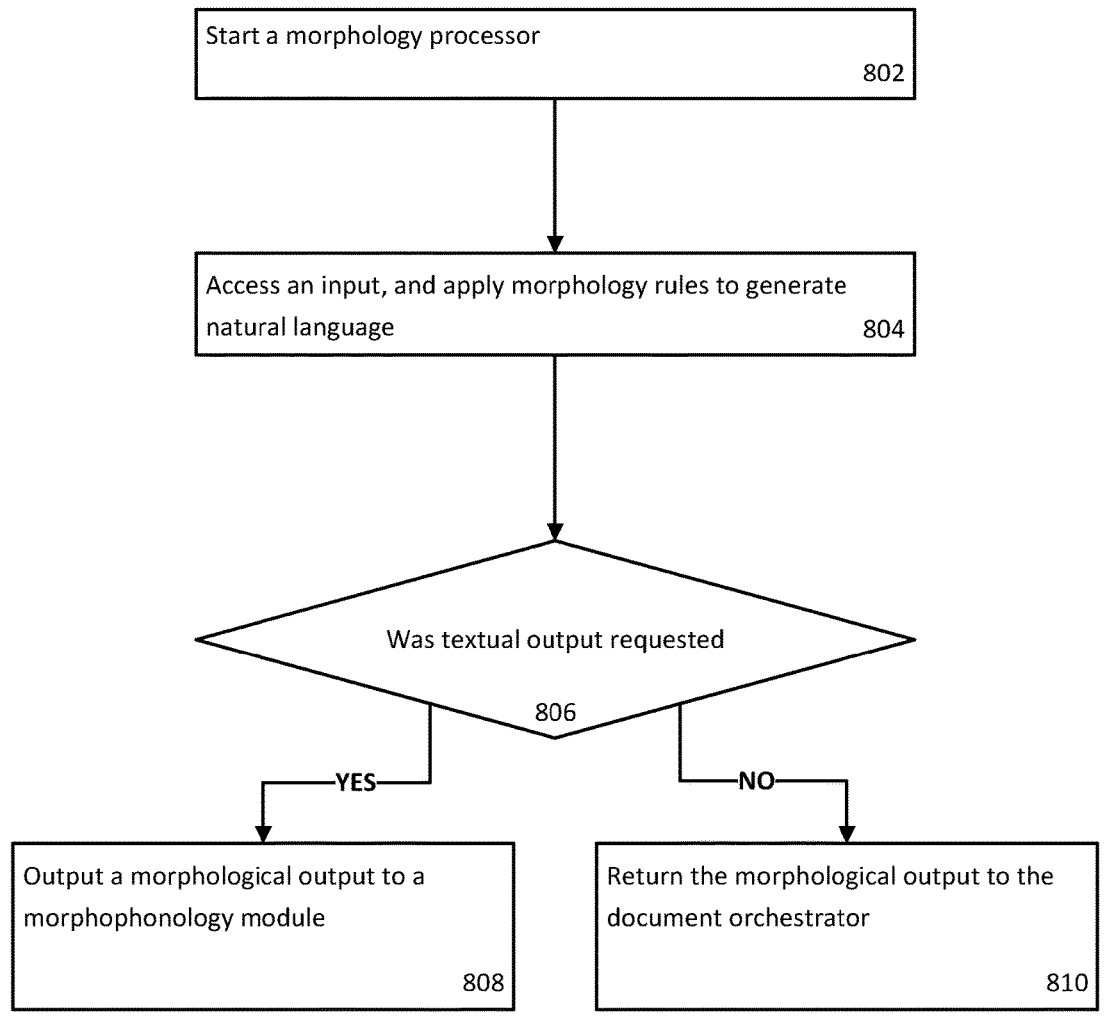
Figure 9:
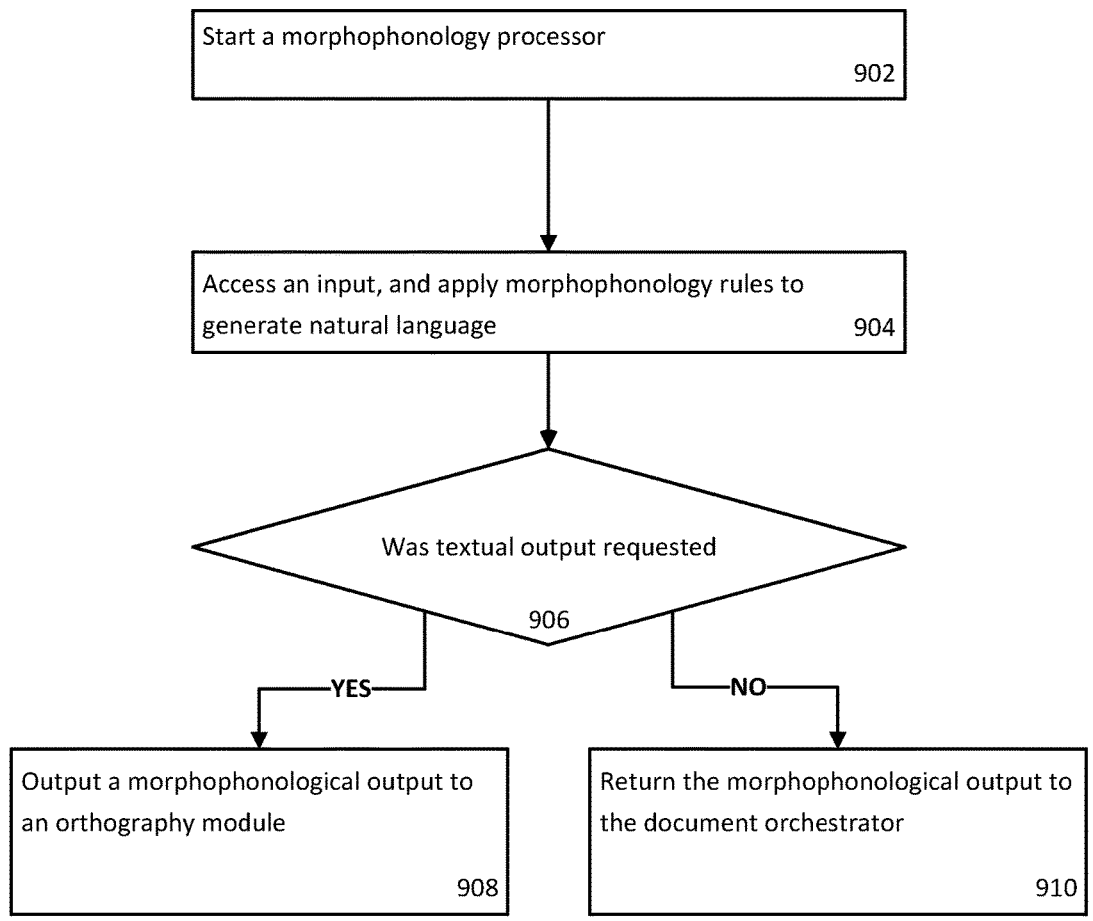
Figure 10:
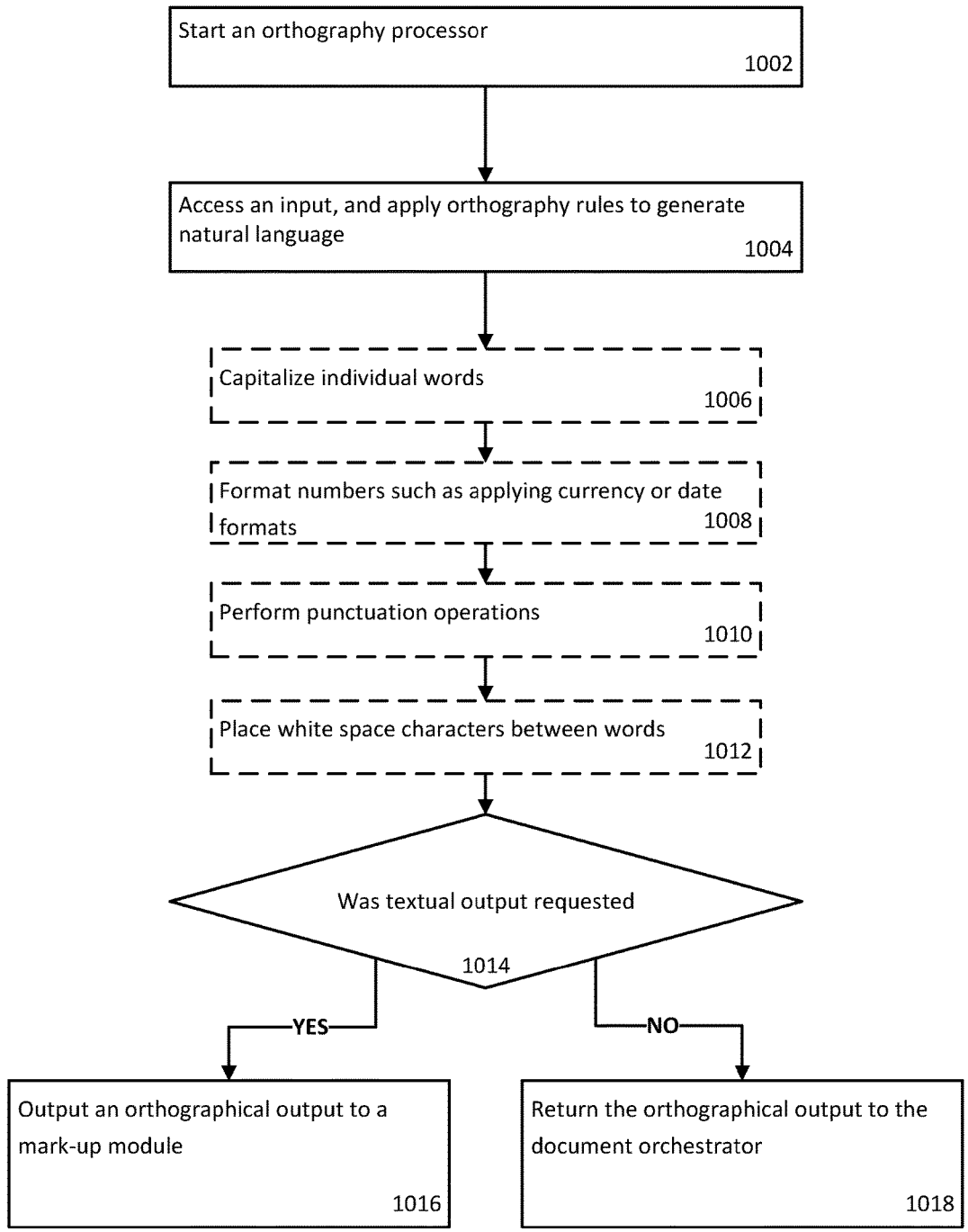
Figure 11:
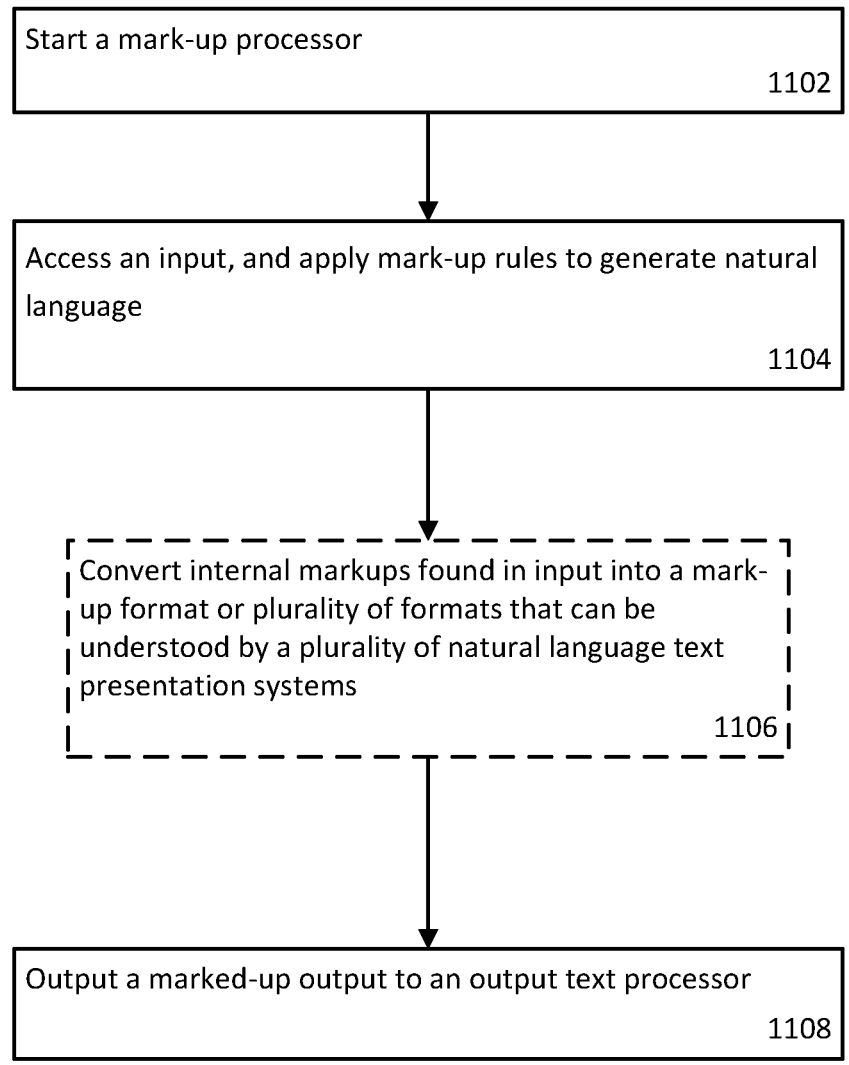

Having thus described embodiments of the invention in general terms, reference will now be made to the accompanying drawings, which are not necessarily drawn to scale, and wherein:

FIG. 1 is a schematic representation of natural language generation environment that may benefit from some example embodiments of the present invention;

FIG. 2 illustrates a block diagram of an apparatus that embodies a natural language generation service in accordance with some example embodiments of the present invention;

FIG. 3 is a flowchart illustrating an example method for generating natural language text at a natural language document orchestrator in a natural language generation service;

FIG. 4 is a flowchart illustrating an example method for invoking a content query document orchestration module; in a natural language document orchestrator;

FIG. 5 is a flowchart illustrating an example method for invoking a document plan document orchestration module in a natural language document orchestrator;

FIG. 6 is a flowchart illustrating an example method for invoking a microplanner document orchestration module in a natural language document orchestrator;

FIG. 7 is a flowchart illustrating an example method for invoking a syntax document orchestration module in a natural language document orchestrator;

FIG. 8 is a flowchart illustrating an example method for invoking a morphology document orchestration module, in a natural language document orchestrator;

FIG. 9 is a flowchart illustrating an example method for invoking a morphophonology document orchestration module in a natural language document orchestrator;

FIG. 10 is a flowchart illustrating an example method for invoking a orthography document orchestration module in a natural language document orchestrator; and FIG. 11 is a flowchart illustrating an example method for invoking a mark-up document orchestration module in a natural language document orchestrator.

DETAILED DESCRIPTION

Example embodiments will now be described more fully hereinafter with reference to the accompanying drawings, in which some, but not all embodiments are shown. Indeed, the embodiments may take many different forms and should not be construed as limited to the embodiments set forth herein; rather, these embodiments are provided so that this disclosure will satisfy applicable legal requirements. Like reference numerals refer to like elements throughout. The term "exemplary", as may be used herein, is not provided to convey any qualitative assessment, but instead merely to convey an illustration of an example. Thus, use of any such terms should not be taken to limit the spirit and scope of embodiments of the present invention.

In some examples, a standard method to generate natural language text may make full use of a natural language pipeline, such as an example natural language generation pipeline (e.g., document planning, microplanning, and realizing) described in Building Natural Language Generation Systems by Ehud Reiter and Robert Dale, Cambridge University Press (2000), which is incorporated by reference in its entirety herein. Such a natural language pipeline may require a specific input such as raw data, such as raw data (or non-linguistic data) describing weather information, and then processing the raw data into natural language text describing the data. Indeed, the pipeline, in such examples, is configured to transform the non-linguistic data into a linguistic text, sometimes requiring the text to be processed by each step of the aforementioned natural language generation pipeline.

However, in natural language generation, it may not always be necessary to utilize each of the steps or modules of a natural language pipeline to generate natural language text. For example, an input, such as text based input, may already be processed to some extent and only require additional morphology processing. In other examples, a sentence may be provided, requiring only minor text processing to account for verb or adjective inflection. In such cases, the processing of the input through an each step of the natural language pipeline would be unneeded.

In some example embodiments, a document orchestrator, such as the document orchestrator described herein, is configured to allow developers to write a script which invokes NLG services at different levels. In some examples, this may include producing a text from a document plan (utilizing a full NLG pipeline), microplanning and realizing a single message (utilizing a NLG pipeline which skips document planning), or generating the text for a syntactic constituent, such as a verb group (e.g., producing "will not eat").

In some example embodiments, the document orchestrator invokes NLG services with a script and will output orchestrated NLG text. In some examples, the orchestrated text is the output of an NLG service called by the document orchestrator, which completes the natural language pipeline. In some examples, the orchestrated text is the output of a single service where a full NLG pipeline is not invoked, such as returning the plural form of a noun (e.g. utilizing a morphology service to produce "children" from child).

In the embodiments, described herein, each NLG service or document orchestration module is configured to receive varying levels of input from structured natural language service inputs, such as document plans or text specifications (realization elements), and/or unstructured natural language service inputs, such as strings, messages, and/or words. Furthermore, each NLG service or document orchestration module is also configured to output varying levels of output from orchestrated structured natural language service outputs, such as document plans or text specifications (realization elements), and/or unstructured natural language service outputs such as orchestrated strings, messages, and/or words.

In some example embodiments, the document orchestrator, is configured to analyze an input script to determine whether to utilize portions of a natural language pipeline based on a given input. Advantageously, and in some examples, the document orchestrator is able to perform, or cause to perform, the appropriate (or requested) level of processing to generate natural language text based on the input script. In some examples, the level of processing may include the entire natural language generation pipeline, whereas, in other examples only a portion of said pipeline is required.

Finally, in some examples, the document orchestrator is configured to generate text, based on the input script, and a determined context in which the generated text will be placed. For example, the orchestrator may perform referring expression generation based on the previously generated text. In other examples, the document orchestration system may generate text in a particular tense based on the preceding text. To orchestrate a document and generate language in the context of the text already generated, provides an additional advantageous feature of some example embodiments described herein.

FIG. 1 is an example block diagram of example components of an example Natural Language Generation Environment 100. In some example embodiments, the Natural Language Generation Environment 100 comprises a Natural Language Generation Service 101. The Natural Language Generation Service 101 may take the form of, for example, a code module, a component, circuitry and/or the like. The components of the Natural Language Generation Environment 100 are configured to provide various logic (e.g. code, instructions, functions, routines and/or the like) and/or services related to a natural language document orchestrator. Other natural language generation services may be used in some example embodiments, such as a natural language generation system as described in Building Natural Language Generation Systems by Ehud Reiter and Robert Dale, Cambridge University Press (2000).

In some example embodiments, Natural Language Generation Environment 100 may also comprise a Content/Data Store 120, and a Scripted Input File 150. The scripted input file can rely on a number of scripting languages, and comprises a series of tasks to be performed by the Scripted File processor 155. In some example embodiments, Scripted Input File 150 may comprise one or more document orchestration requests (e.g., a request for processing of an input by the Document Orchestrator 110).

In some examples, Content/Data Store 120 may comprise memory to store output components of a natural language document orchestrator. In some example embodiments, Content/Data Store 120 may comprise content accessible to a natural language document orchestrator to aid in the generation of natural language text, such as a natural language lexicon. A lexicon is a "dictionary" for stored words of a particular language. It identifies the part of speech and other information about words. A lexicon may also include information concerning morphological inflections, syntactic features (such as transitive verbs), whether to include "a" or "an" before a given word, and spelling variants of a single word (such as "colour" and "color").

Alternatively or additionally, the Content/Data Store 120 may also store messages, which are language independent data structures that correspond to informational elements in a text and/or collect together underlying data, referred to as slots, arguments or features, which can be presented within a fragment of natural language such as a phrase or sentence. Messages may be represented in various ways; for example, each slot may consist of a named attribute and its corresponding value; these values may recursively consist of sets of named attributes and their values, and each message may belong to one of a set of predefined types.

Alternatively or additionally, the Content/Data Store 120 may also comprise an ontology (e.g. a domain model) that formally represents knowledge about the application scenario. In some examples, the domain model is a representation of information about a particular domain. For example, a domain model may contain an ontology that specifies the kinds of objects, concepts and/or the like that may exist in the domain in concrete or abstract form, properties that may be predicated of the objects, concepts and the like, relationships that may hold between the objects, concepts and the like, and representations of any specific knowledge that is required to function in the particular domain.

Alternatively or additionally, the Content/Data Store 120 may also store the relevant aspects of a discourse context, such as a list of entities mentioned in the text so far, to include the lexicalization of the previous sentence in a text, parameters set by the document planner, genre parameters and/or the like. Alternatively or additionally, a discourse context may be stored as a separate data structure apart from the Content/Data Store 120 to be accessible for operations outside of the Content/Data Store 120.

In some example embodiments, a natural language generation service, such as Natural Language Generation Service 101 comprises a Document Orchestrator 110, In some examples, Document Orchestrator 110 is configured to generate phrases, sentences, text or the like which may take the form of natural language text. In some example embodiments, Document Orchestrator 110 may generate a natural language output text, such as Output Text 165.

In some example embodiments, Document Orchestrator 110 comprises a scripted filed processor, such as Scripted File Processor 155, an output text processor, such as Output Text Processor 160, and one or more document orchestration modules. For example, the one or more document orchestration modules may comprise a content query processor, such as Content Query Processor 111, a document plan processor, such as Document Plan Processor 112, a microplanner processor, such as Microplanner Processor 113, a syntax processor, such as Syntax Processor 114, a morphology processor, such as Morphology Processor 115, a morphophonology processor, such as Morphophonology Processor 116, an orthography processor, such as Orthography Processor 117, and a mark-up processor, such as Mark-Up Processor 118. In alternative examples, other natural language generation modules may be used.

In some examples, Content Query Processor 111, may be configured to query the Content/Data store 120 that comprises one or more messages and/or raw input data.

In some examples, messages are language independent data structures that correspond to informational elements in a text and/or collect together underling data in such a way that the underlying data can be linguistically expressed. In some examples, messages are created based on a requirements analysis as to what is to be communicated for a particular scenario (e.g. for a particular domain). A message typically corresponds to a fact about the underlying data (for example, the existence of some observed event) that could be expressed via a simple sentence (although it may ultimately be realized by some other linguistic means). For example, to linguistically describe wind, a user may want to know a speed, a direction, a time period or the like, but also the user wants to know changes in speed over time, warm or cold fronts, geographic areas and or the like. In some cases, users do not even want to know wind speed; they simply want an indication of a dangerous wind condition. Thus, a message related to wind speed may include fields to be populated by data related to the speed, direction, time period or the like, and may have other fields related to different time points, front information or the like. The mere fact that wind exists may be found in the data, but to linguistically describe "light wind" or "gusts" different data interpretation must be undertaken as is described herein.

In some examples, a message is created in an instance in which the raw input data or the historical data warrants the construction of such a message. For example, a wind message would be constructed in an instance in which wind data was present in the raw input data. Alternatively or additionally, while messages may correspond directly to observations taken from the raw data input, others, however, may be derived from the observations by means of a process of inference. For example, the presence of rain may be indicative of other conditions, such as the potential for snow at some temperatures.

The concepts and relationships that make up messages may be drawn from an ontology (e.g. a domain model) that formally represents knowledge about the application scenario. For example, message structures may be defined based on a particular alert condition and/or the raw input data, such as but not limited to the primary and/or related data channels. Messages may also be derived from another data structure, may be user defined and/or the like. Each type of message may also be represented by a message template, which expresses a relationship between instances of a number of concepts; the message template contains slots which may be filled in, or instantiated, using particular values that are derived from the raw input data.

In some examples, a document plan processor, such as Document Plan Processor 112, is configured to input the one or more messages and/or formatted instructions and arrange them. The Document Plan Processor 112 may also comprise a structuring process that determines the order of messages referring to the key events and/or significant events to be included in a natural language text. In some example embodiments, the Document Plan Processor 112 may access one or more text schemas for the purposes of content determination and document structuring. A text schema is a rule set that defines the order in which a number of messages are to be presented in a document. The output of the Document Plan Processor 112 may be a tree-structured object or other data structure that is referred to as a document plan. In an instance in which a tree-structured object is chosen for the document plan, the leaf nodes of the tree may contain the messages, and the intermediate nodes of the tree structure object may be configured to indicate how the subordinate nodes are related (e.g. elaboration, consequence, contrast and/or the like) to each other.

In some examples, a microplanner processor, such as Microplanner Processor 113, is configured to create one or more texts or realization elements from one or more messages, such that messages may be further processed to be expressed in natural language.

In some example embodiments, the Microplanner Processor 113 may perform aggregation, lexicalization, and referring expression generation. In some examples, aggregation includes, but is not limited to, determining whether two or more messages can be combined together linguistically to produce a more complex sentence. The output of the Microplanner Processor 113, in some example embodiments, is a tree-structured text specification whose leaf-nodes form realization elements (or phrase specifications), and whose internal nodes express rhetorical relations between the leaf nodes.

A realizer (not shown) comprises one or more of a syntax processor, such as Syntax Processor 114, a morphology processor, such as Morphology Processor 115, a morphophonology processor, such as Morphophonology Processor 116, an orthography processor, such as Orthography Processor 117, and a mark-up processor, such as Mark-Up Processor 118. In one example, the realizer may be invoked directly from the Document Orchestrator 110. For example, a user can request the plural form of a word by calling a getPlural service with the base form of the word as a parameter (e.g., getPlural ("child") returns "children").

Alternatively or additionally, the realizer may be configured to traverse the tree-structured text specification to express the tree-structured text specification in natural language. The realization process that is applied to each phrase specification in a text specification makes use of a grammar which specifies the valid syntactic structures in the language and further provides a way of mapping from text specifications into the corresponding natural language sentences. The output of the process is, in some example embodiments, a well-formed natural language text.

The Syntax Processor 114 is configured, in some example embodiments, to access an input, and apply syntactic rules to generate natural language. For example, Syntax Processor 114 may be configured to perform verb group formation (e.g., VerbGroup("eat", PAST) returns "ate" and VerbGroup ("eat", FUTURE, NEGATED) returns "will not eat").

The Syntax Processor 114 is further configured, in some examples, to at least add closed class function words such as conjunctions (and, or), articles (a, the), demonstratives (this, that) and prepositions (to, from, at, with). In some embodiments, the Syntax Processor 114 is also configured to add morphological inflections. In some embodiments, the Syntax Processor 114 is also configured to propagate features in a realization element.

The Morphology Processor 115 is configured, in some example embodiments, to access an input, and apply morphology rules to generate natural language. For example, the Morphology Processor 115 may be configured to return inflected word forms from input base word forms, such as by returning words in an inflected word form according to a language morphology rule file. By way of example, given an input "John, love, mango," wherein mango includes the plural feature (i.e., mango[number: plural]), the Morphology Processor 115 is configured to output "John loves mangoes." The morphing of love and mango from the base form to the inflected form is morphology. Alternatively or additionally, the Morphology Processor 115 may map inflected word forms to base word forms prior to mapping the base word forms to inflected word forms, to avoid errors in inflection.

In some examples, the Morphology Processor 115 is configured to mark the base word forms by the part of speech (pos) from which they come so that, for example, the noun date (day of the month or sweet edible fruit) is not confused with the verb date (assign a date to or meet a with a lover). In some examples, the correct part of speech may be taken from an input realization element. For example, love may be marked pos=verb. In this example, the Morphology Processor 115 is informed by the input realization element as to what base form should be used.

In some examples, the Morphology Processor 115 is configured to receive a base word form and to access a lexicon to determine if it specifies the inflected form. If it does not, default morphology rules are applied as shown above. For example, in the case of arise the default output would be arised. However, the lexicon will override this default setting and specify arose.

In some examples embodiments, the Morphophonology Processor 116 is configured to access an input, and apply morphophonology rules to generate natural language. In some examples, the Morphophonology Processor 116 may be configured to determine a prefix or indefinite article such as the English words "a" or "an." In some examples, the prefixes stored in memory specify that "an" should be used before any word that starts with the letters "um" (e.g., "an umbrella") but "a" for any word starting with "uni" (e.g., "a university"). For example, when accessing or receiving an input at Morphophonology Processor 116 including the word components of the sentence "john attends an university", Morphophonology Processor 116 is configured to output "a" instead of "an."

The Orthography Processor 117 is configured, in some example embodiments, to access an input, and apply orthography rules to generate natural language. For example, Orthography Processor 117 may be configured to receive an input to generate an orthographically processed output (e.g., formList(["apple", "banana", "pear"]) would return either "apple, banana, and pear" or "apple, banana and pear", depending on a given Oxford Comma Style parameter). In some examples, the orthographically processed natural language is generated by capitalizing individual words or sentences. For example, the Orthography Processor 117 may be configured, in some examples, to input "john loves mangoes" and to output "John loves mangoes." In some example embodiments, capitalization of an input data structure can be controlled in several ways including leaving the capitalization as is, capitalizing the first letter of the first word in a sentence or clause, capitalizing the first letter of every word in a sentence or clause, capitalizing all words in a clause or sentence in upper case, or setting all words in a clause or sentence in lower case.

The Mark-Up Processor 118 is configured, in some example embodiments, to access an input, and apply mark-up rules to generate natural language. For example, mark-up processor may be configured to generate a marked-up realization element by converting internal markups into a mark-up format or plurality of formats that can be understood by a plurality of natural language text presentation systems by performing various mark-up services (e.g., if the output is to be configured as HTML then input boldFont("apple") would return <B>apple</B>). In some examples, mark-up services can include outputting bold font or red text. In some examples, the natural language text presentation systems can include HTML, Latex, or Word RTF.

In some examples, Scripted File Processor 155 may be configured to call various NLG services or document orchestration modules discussed above, which might range from realizing a complete document plan to just getting the plural form of a word. In some examples, Scripted File Processor 155 may also be configured to receive and/or access a scripted input language file, such as Scripted Input File 150, containing one or more document orchestration requests (i.e. calls to NLG services that range from realizing a complete document plan to just getting the plural form of a word). Scripted File Processor 155 may further parse Scripted Input File 150 to determine the contents of the one or more document orchestration requests. In some examples, the document orchestration requests may comprise an identification of a document orchestration module of one or more document orchestration requests and formatted instructions for execution by the document orchestration module. Further examples of formatted instructions for execution by a document orchestration module, are discussed in more detail in relation to FIG. 3.

In some examples, Document Orchestrator 110 may comprise communication channels between the processors and orchestration modules such as Communication Channel 130 and Communication Channel 140. In some examples, Communication Channel 130 may be configured to invoke document orchestration modules and pass the document orchestration module the formatted instructions from Scripted File Processor 155. In some examples, Communication Channel 140 may be configured to receive a natural language output from a document orchestration module and pass the natural language output to Scripted File Processor 155 or Output Text Processor 160. Alternatively or additionally, an output of a document orchestration module may be text (whereas in other examples, the output of a document orchestration module may be passed to any other document orchestration module in Document Orchestrator 110).

In one particular example, Document Orchestrator 110, may be embodied using a template engine, such as an Apache Velocity template engine by utilizing HTML pages as velocity templates embodied in a scripted input language file.

For example, the following instructions contained in a scripted input language file will invoke a morphology module:

$emp.FIRST_NAME manages $no_accounts $!nlg.pluraliseNoun("account", $no_accounts) for ABC Co Ltd.

In this above example, pluraliseNoun invokes a morphology module and returns a singular or plural form, depending on the number, of "$no_accounts".

Another example embodiment includes:
$!nlg.microplanrealise($sunshineMessage)
$!nlg.microplanrealise ($maxTempMessage)
$!nlg.microplanrealise ($rainfallMessage)

In this example, the scripted input language file includes three orchestration requests. The requests are configured to microplan and realize three messages: sunshineMessage, maxTempMessage, and rainfallMessage.

FIG. 2 is an example block diagram of an example computing device for practicing embodiments of an example Document Orchestrator 110. In particular, FIG. 2 shows a Computer System 200 that may be utilized to implement a Natural Language Generation Environment 100 having a Natural Language Generation Service 101. The Natural Language Generation Service 101 having a Scripted Input File 150 and a Content/Data Store 120. The Natural Language Generation Service 101 includes, in some examples, a Document Orchestrator 110. The Document Orchestrator including a Scripted File Processor 155, a Content Query Processor 111, a Document Plan Processor 112, a Microplanner Processor 113, a Syntax Processor 114, a Morphology Processor 115, a Morphophonology Processor 116, an Orthography Processor 117, and a Mark-Up Processor 118, Output Text Processor 160, a Communication Channel 130, and a Communication Channel 140.

One or more general purpose or special purpose computing systems/devices may be used to implement the Natural Language Generation Service 101. In addition, the Computer System 200 may comprise one or more distinct computing systems/devices and may span distributed locations. In some example embodiments, the Natural Language Generation Service 101 may be configured to operate remotely via the network 250. In other example embodiments, a pre-processing module or other module that requires heavy computational load may be configured to perform that computational load and thus may be on a remote device or server. For example, Document Orchestrator 110 may be accessed remotely. Furthermore, each block shown may represent one or more such blocks as appropriate to a specific example embodiment. In some cases, one or more of the blocks may be combined with other blocks. Also, the Natural Language Generation Service 101 may be implemented in software, hardware, firmware, or in some combination to achieve the capabilities described herein.

In the example embodiment shown, Computer System 200 comprises a computer memory, such as Memory 201, a Display 202, one or more processors, such as Processor 203, Input/Output devices 204 (e.g., keyboard, mouse, CRT or LCD display, touch screen, gesture sensing device and/or the like), Other Computer-Readable Media 205, and Communications Interface 206. The Processor 203 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application-specific integrated circuit (ASIC) or field-programmable gate array (FPGA), or some combination thereof. Accordingly, although illustrated in FIG. 2 as a single processor, in some embodiments the Processor 203 comprises a plurality of processors. The plurality of processors may be in operative communication with each other and may be collectively configured to perform one or more functionalities of the natural language document orchestrator as described herein.

The Natural Language Generation Service 101 is shown residing in Memory 201. The Memory 201 may comprise, for example, transitory and/or non-transitory memory, such as volatile memory, non-volatile memory, or some combination thereof. Although illustrated in FIG. 2 as a single memory, the Memory 201 may comprise a plurality of memories. The plurality of memories may be embodied on a single computing device or may be distributed across a plurality of computing devices collectively configured to function as the natural language generation service. In various example embodiments, the Memory 201 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof.

In other embodiments, some portion of the contents, some or all of the components of the Natural Language Generation Service 101 may be stored on and/or transmitted over the Other Computer-Readable Media 105. The components of the Natural Language Generation Service 101 preferably execute on one or more Processors 203 and are configured to enable operation of a natural language document orchestrator, such as Document Orchestrator 110, as described herein.

Alternatively or additionally, other code or such as Other Programs 230 (e.g., an administrative interface, a Web server, and the like) and potentially other data repositories, also reside in the Memory 201, and preferably execute on one or more Processors 203. Of note, one or more of the components in FIG. 2 may not be present in any specific implementation. For example, some embodiments may not provide Other Computer Readable Media 205 or a Display 202.

The Natural Language Generation Service 101 is further configured to provide functions such as those described with reference to FIG. 1. The Natural Language Generation Service 101 may interact with the Network 250, via the Communications Interface 206, with Remote Data Sources 252 (e.g. remote reference data, remote lexicalization rules, remote aggregation data, remote genre parameters, remote orchestration requests, remote formatted instructions and/or the like), Third-Party Content 254 and/or Client Devices 256. The Network 250 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX, Bluetooth) that facilitate communication between remotely situated humans and/or devices. In some instances, the Network 250 may take the form of the internet or may be embodied by a cellular network such as an LTE based network. In this regard, the Communications Interface 206 may be capable of operating with one or more air interface standards, communication protocols, modulation types, access types, and/or the like. The Client Devices 256 may include desktop computing systems, notebook computers, mobile phones, smart phones, personal digital assistants, tablets and/or the like.

In an example embodiment, components/modules of the Natural Language Generation Service 101 are implemented using standard programming techniques. For example, the Natural Language Generation Service 101 may be implemented as a "native" executable running on the Processor 203, along with one or more static or dynamic libraries. In other embodiments, the Natural Language Generation Service 101 may be implemented as instructions processed by a virtual machine that executes as one of the Other Programs 230. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use synchronous or asynchronous client-server computing techniques. Also, the various components may be implemented using more monolithic programming techniques, for example, as an executable running on a single processor computer system, or alternatively decomposed using a variety of structuring techniques, including but not limited to, multiprogramming, multithreading, client-server, or peer-to-peer, running on one or more computer systems each having one or more processors. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the Natural Language Generation System 101, such as by using one or more application programming interfaces can be made available by mechanisms such as through application programming interfaces (API) (e.g. C, C++, C#, and Java); libraries for accessing files, databases, or other data repositories; through scripting languages such as XML; or through Web servers, FTP servers, or other types of servers providing access to stored data. Alternatively or additionally, the Scripted Input File 150, and/or Content/Data Store 120 may be local data stores but may also be configured to access data from the Remote Data Sources 252.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the Natural Language Generation Service 101 may be implemented or provided in other manners, such as at least partially in firmware and/or hardware, including, but not limited to one or more ASICs, standard integrated circuits, controllers executing appropriate instructions, and including microcontrollers and/or embedded controllers, FPGAs, complex programmable logic devices ("CPLDs"), and the like. Some or all of the system components and/or data structures may also be stored as contents (e.g., as executable or other machine-readable software instructions or structured data) on a computer-readable medium so as to enable or configure the computer-readable medium and/or one or more associated computing systems or devices to execute or otherwise use or provide the contents to perform at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

FIGS. 3-11 illustrate example flowcharts of the operations performed by an apparatus, such as Computer System 200 of FIG. 2, in accordance with example embodiments of the present invention. It will be understood that each block of the flowcharts, and combinations of blocks in the flowcharts, may be implemented by various means, such as hardware, firmware, one or more processors, circuitry and/or other devices associated with execution of software including one or more computer program instructions. For example, one or more of the procedures described above may be embodied by computer program instructions. In this regard, the computer program instructions which embody the procedures described above may be stored by a Memory 201 of an apparatus employing an embodiment of the present invention and executed by Processor 203 in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 3-11, when executed, convert a computer or processing circuitry into a particular machine configured to perform an example embodiment of the present invention. Accordingly, the operations of FIGS. 3-11 define an algorithm for configuring a computer or processor, to perform an example embodiment. In some cases, a general purpose computer may be provided with an instance of the processor which performs the algorithm of FIGS. 3-11 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowcharts', and combinations of blocks in the flowchart, can be implemented by special purpose hardware-based computer systems which perform the specified functions, or combinations of special purpose hardware and computer instructions.

In some example embodiments, certain ones of the operations herein may be modified or further amplified as described below. Moreover, in some embodiments additional optional operations may also be included. It should be appreciated that each of the modifications, optional additions or amplifications described herein may be included with the operations herein either alone or in combination with any others among the features described herein.

FIG. 3 is a flowchart illustrating an example method for generating natural language text at a natural language document orchestrator, such as by Document Orchestrator 110, in a natural language generation service, such as Natural Language Generation Service 101. At block 302, a natural language document orchestrator, such as Document Orchestrator 110, accesses a scripted input language file, such as Scripted Input File 150, wherein the scripted input language file comprises one or more document orchestration requests. In some embodiments, Document Orchestrator 110 is configured to receive Scripted Input Language File 150 from an input device, such as I/O Devices 204. In some examples, Scripted Input File 150 is directly accessed by and/or received at a scripted input language file processor, such as, Scripted File Processor 155. Alternatively or additionally, the scripted file could be generated by a user via a user interface, and input in the form of a scripted file to the Document Orchestrator 110.

Alternatively or additionally, the system may not require a scripted input file, but may simply receive individual document orchestration requests from a user via a user interface or other input means. In such cases, the output text may be based on the user input or a combination of a series of user inputs.

At block 304, Document Orchestrator 110 is configured to parse the one or more document orchestration requests by a processor, such as Scripted File Processor 155, wherein each document orchestration request comprises an identification of a document orchestration module of one or more document orchestration requests and formatted instructions for execution by the document orchestration module. In some examples, a document orchestration request may identify a first orchestration module to invoke and include formatted instructions to further process the output of the first orchestration module into natural language text. For example, Scripted File Processor 155 may parse Scripted Input File 150 to determine that the Scripted Input File 150 contains a document orchestration request. Scripted File Processor 155 may further determine that the document orchestration requests identifies a document orchestration module, such as a document planner module, and formatted instructions to utilize the document planner module. In some examples, the document orchestration request may take the form of an application programming interface call whereas in other examples, the document orchestration request may rely on a velocity template.

In some example embodiments, the formatted instructions may include instructions to initiate a Text Generation Service (TextGenerationService), on a scripted input language file processor, such as Scripted File Processor 155, which may be configured once for the runtime of the application, such as a natural language document orchestrator, and is then repeatedly called by any code that needs to realize messages utilizing a natural language document orchestrator, such as Document Orchestrator 110. An application of the document orchestrator may want to preserve a state across multiple calls to document orchestrator modules so to preserve a discourse model (e.g., context) across calls. In some examples, context information or information related to the discourse model may be included in a document orchestration call.

At block 306, a natural language document orchestrator, such as Document Orchestrator 110, is configured to execute the one or more document orchestration requests, such as the document orchestration requests described above. In some examples, Document Orchestrator 110 may execute only one document orchestration request and output natural language text. In some other examples, there may be one or more document orchestration requests to be executed by Document Orchestrator 110 before natural language output text may be outputted.

In one example, Document Orchestrator 110 may execute a document orchestration request including an identification of the document plan processor and formatted instructions to utilize the document plan processor. In some examples, the document plan processor is configured to return an output to the Document Orchestrator Module 110, whereas in other examples the document plan processor may output to the Microplanner Processor 113.

At block 308, a natural language document orchestrator, such as Document Orchestrator 110, is configured to invoke the document orchestration module identified in block 304. In some examples, Document Orchestrator 110 invokes the document orchestration module by calling an associated processor over a communication channel, such as Communication Channel 130. In some examples, the document orchestration module may be invoked by Scripted File Processor 155. For example, Scripted File Processor 155 may identify the document plan document orchestration module and invoke the associated processor, such as Document Plan Processor 112.

At block 310, a document orchestrator, such as Document Orchestrator 110 is configured to pass the document orchestration module the formatted instructions (see e.g., FIGS. 5-11). In some examples, a scripted input language file processor, such as Scripted File Processor 155, may pass the parsed instructions from the Scripted File Processor 155 to the document orchestration module. In some examples, the Scripted File Processor 155 may parse the formatted instructions for a document plan module and pass the invoked Document Plan Processor 112, the parsed formatted instructions over a communication channel, such as Communication Channel 130.

At block 312, a document orchestrator, such as Document Orchestrator 110 is configured to receive a natural language output from the document orchestration module. In some examples, the natural language output may be output from the document orchestration module to a data store, such as Content/Data Store 120, for further use by Document Orchestrator 110. In some examples, the natural language output may be output from the document orchestration module back to a scripted file processor, such as Scripted File Processor 155, one or more other document orchestration modules, and/or an output text processor, such as Output Text Processor 160. In some examples, the output may be outputted utilizing a communication channel such as Communication Channel 140.

At block 314, a document orchestrator, such as Document Orchestrator 110 is configured to process the natural language output to generate natural language text. In some examples, processing the natural language output to generate the natural language text may comprise completing a natural language generation pipeline. For example, a natural language output document plan from Document Plan Processor 112 may then be further processed by the remaining document orchestration module processors in a natural language pipeline such as Microplanner Processor 113, and the natural language realizer document orchestration modules, such as Syntax Processor 114, Morphology Processor 115, Morphophonology Processor 116, Orthography Processor 117, and Mark-Up Processor 118.

In another example, a natural language output from Morphology Processor 115 may then be further processed by the remaining document orchestration module processors in a natural language pipeline such as Morphophonology Processor 116, Orthography Processor 117, and Mark-Up Processor 118.

Alternatively or additionally, in some examples the natural language output from the document orchestration module processor, such as Document Plan Processor, may be returned to the Document Orchestrator for further processing. In some examples, the natural language output of Document Plan Processor 112 may be returned to Scripted File Processor 155 by Communication Channel 140, prior to invoking further document orchestration requests.

At block 316, a document orchestrator, such as Document Orchestrator 110 is configured to determine that all document orchestration requests of the parsed input language file have executed. In some examples, Scripted File Processor 155 is configured to determine that all the document orchestration requests have executed. If it is determined that all the document orchestration requests have executed, then the process proceeds to block 318. If it is determined that all the document orchestration requests have not been executed, then the process returns to block 306.

At block 318, a document orchestrator, such as Document Orchestrator 110 is configured to Output the natural language text via an output text processor, such as Output Text Processor 160. In some examples, the Output Text Processor 160 receives natural language output from Mark-Up Processor 118. In some examples, Output Text Processor 160 receives one or more natural langue output via Communication Channel 140 from one or more document plan module processors. In some examples the text is output via a user interface, whereas in other examples, the text may be output via a file or other method, such as electronic mail, voice communication, or the like.

FIG. 4 is a flowchart illustrating an example method for invoking a content query document orchestration module, such as Content Query Processor 111, in a natural language document orchestrator, such as Document Orchestrator 110. In block 402, Document Orchestrator 110 is configured to start a content query processor such as Content Query Processor 111.

In some examples, Document Orchestrator 110 starts the content query module by invoking the content query processor and passing the processor the formatted instructions. In some examples, Scripted File Processor 155 is configured to start Content Query Processor 111 through Communication Channel 130, by invoking Content Query Processor 111 and passing associated formatted instructions to Content Query Processor 111.

At block 404, the content query document orchestration module, such as Content Query Processor 111 is configured to create a new instance of a content query, based on the formatted instructions.

At block 406, the content query document orchestration module, such as Content Query Processor 111 is configured to query the content store and return messages. In some examples, Content Query Processor 111 is configured to utilize the formatted instructions to at least perform one or more of selecting a message type, gathering one or more message instances, and/or sorting one or more messages. In some examples, the Content Query Processor 111 is configured to query or otherwise access the content/data store 120.

At block 408, the content query document orchestration module, such as Content Query Processor 111 is configured to select a message type comprising one or more argument classes and one or more child classes of the content query, wherein the one or more argument classes and the one or more child classes identify the content to be queried.

In some examples, multiple argument classes may be queried to search for messages about multiple subjects. For example, messages about both wind and rain may be queried together to include messages which related to both classes or subjects.

At block 410, the content query document orchestration module, such as Content Query Processor 111, is configured to gather one or more message instances by querying a content store, such as Content/Data Store 120, by argument class and child classes, selected in block 408, wherein the one or more message instances comprise unordered portions of a natural language text representing the queried content. In some examples, the Content Query Processor 111 utilizes the formatted instructions to execute the content query.

For further example, to get all messages of certain type, such as related to wind, i.e. WindMessage, the formatted instructions may include the following commands to query Content/Data Store 120:

List<Message>result=qp.query("WindMessage").all( );
List<Message>result2=qp.query( ).all("WindMessage");

At block 412, the content query document orchestration module, such as Content Query Processor 111 is configured to sort the one or messages gathered at block 410, by at least one of content sort properties and comparators. In some examples, the Content Query Processor 111 utilizes the formatted instructions to sort the gather messages. The formatted instructions may take a variety of forms with various resulting functionality in the sorting of the messages.

In some examples, the formatted instructions may include instructions to sort gathered messages relating to a particular message, such as WindMessage, including properties such as "name" and "importance" among others.

In some further examples, Content Query Processor 111 may be further configured to limit a number of items returned from a content query. For example, a common use case for constructing Content Store queries is to limit the number of messages returned by a query, such as limiting to the top five most relevant messages in the content/data store.

In some example emblements, a content query document orchestration module, such as Content Query Processor 111 may also be configured to receive formatted instructions to create and store message instances in a content store such as Content/Data Store 120. In some example embodiments, the formatted instructions include instructions to initiate a ContentStore instance, add relevant message classes to the ContentStore, and create a message instance from JSON (JavaScript Object Notation) instructions.

At block 414, the content query document orchestration module, such as Content Query Processor 111 is configured to output the sorted messages. In some examples, Content Query Processor 111 is configured to output the sorted messages to a next step in a natural language generation pipeline a document plan orchestration module such as Microplanner Processor 113. In some examples, Content Query Processor 111 is configured to output the sorted messages to an output text processor such as Output Text Processor 160 via Communication Channel 140. In some examples, Content Query Processor 111 is configured to output the sorted messages to Scripted File Processor 155, via Communication Channel 140, for further processing by Document Orchestrator 110.

FIG. 5 is a flowchart illustrating an example method for invoking a document plan document orchestration module, such as Document Plan Processor 112, in a natural language document orchestrator, such as Document Orchestrator 110. At block 502, Document Orchestrator 110 is configured to start a document plan processor, such as Document Plan Processor 112. In some examples, Document Plan Processor 112, is configured to input one or more messages and/or the formatted instructions to arrange the messages. In some examples, Document Orchestrator 110 starts the document plan module by invoking the document plan processor and passing the processor one or more messages and/or formatted instructions. In some examples, Scripted File Processor 155 is configured to start Document Plan Processor 112 through Communication Channel 130, by invoking Document Plan Processor 112 and passing associated one or more messages and/or formatted instructions to Document Plan Processor 112.

In some examples, Document Plan Processor 112 may start by creating a "DocPlanGenerator" instance call utilizing formatted instructions such as:
DocPlanGenerator dpg=new DocPlanGeneratorImpl( );

At block 504, the document plan module, such as Document Plan Processor 112 is configured to instantiate a document plan with one or more messages. In some examples, this includes the one or more messages inputted at block 502. In some examples, messages may include one or more messages generated by the Content Query Processor 111 and/or stored in the Content/Data Store 120, based on the formatted instructions. In some examples, the one or more messages may be sorted messages from a content query document orchestration module, such as Content Query Processor 111.

In some examples, the Document Plan Processor 112 may include formatted instructions to create a document plan. For example:
DocPlan document(DocPlan . . . docplans) takes zero or more DocPlan objects and creates a docplan:
DocPlan result=dpg.document(dpg.paragraph("this will be a canned text sentence", ms g1));

At block 506, the document plan document orchestration module, such as Document Plan Processor 112, is configured to determine if textual output was requested in the formatted instructions. For example, the formatted instructions may include instructions such as "target=text". If the output text is requested, the example method proceeds to block 508. If output text was not requested the example method proceeds to block 510.

At block 508, the document plan document orchestration module, such as Document Plan Processor 112, is configured to output the document plan to a microplanner module. In some examples, Document Plan Processor 112 is configured to further complete a natural language generation pipeline by outputting the document plan to a microplanner document orchestration module such as Microplanner Processor 112. As the remaining modules of the pipeline complete, a textual output will be generated.

At block 510, the document plan document orchestration module, such as Document Plan Processor 112, is configured to return the document plan to the document orchestrator. In some examples, Document Plan Processor 112 is configured to output the document plan to an output text processor such as Output Text Processor 160 via Communication Channel 140. In some examples, Document Plan Processor 112 is configured to output the document plan to Scripted File Processor 155, via Communication Channel 140, for further processing by Document Orchestrator 110.

FIG. 6 is a flowchart illustrating an example method for invoking a microplanner document orchestration module, such as Microplanner Processor 113, in a natural language document orchestrator, such as Document Orchestrator 110. In block 602, Document Orchestrator 110 is configured to start a microplanner processor, such as Microplanner Processor 113. In some examples, Microplanner Processor 113, is configured to input one or more messages and/or formatted instructions to create one or more texts or realization elements from one or more messages. In some examples, Document Orchestrator 110 starts the microplanner module by invoking the microplanner processor and passing the processor the formatted instructions. In some examples, Scripted File Processor 155 is configured to start Microplanner Processor 113 through Communication Channel 130, by invoking Microplanner Processor 113 and passing associated formatted instructions to Microplanner Processor 113.

Alternatively or additionally, in some examples, Microplanner Processor 113 is invoked by a document plan document orchestration module, such as Document Plan Processor 112, as part of a natural language generation pipeline, which starts the microplanner module by invoking the microplanner processor and passing the processor a document plan.

At block 604, the microplanner document orchestration module, such as Microplanner Processor 113 is configured to access an input and apply microplanner rules to generate one or more phrase specifications. In some examples, the input may be a structured document plan outputted from a document plan document orchestration module, such as Document Plan Processor 112, or contained in the formatted instructions. In some examples, the input may be one or more messages and/or formatted instructions to create one or more texts or phrase specifications (realization elements) from one or more messages received from Scripted File Processor 155 or stored in Content/Data Store 120.

In some examples, applying microplanner rules to generate one or more phrase specifications may comprise converting at least one message in the input, such as a document plan or messages, into a phrase specification. Applying microplanner rules to generate one or more phrase specifications may further include applying one or more lexicalization rules, aggregation rules, or referring expression rules, and/or determining aspects of ordering.

In some examples, the input, such as a document plan, may contain one or more leaf nodes that contain messages. Initially and in some example embodiments, the text specification may include a tree structure that matches or is otherwise structured in the same or similar manner as a document plan tree. Each leaf node of a text specification may include a phrase specification with one or more empty elements. The Microplanner Processor 113 may be configured to populate those element values by applying genre parameters, lexicalization rules, reference rules, aggregation rules and the like.

In some example embodiments, the Microplanner Processor 113 may be configured to input a series of genre parameters that are representative of genre conventions. Genre conventions are rules about the use of language which apply throughout texts in that particular genre, and may be accessible by any of the Document Orchestrator modules described herein. In some examples, however, the rules may be overridden by a user, by lexicalization rules and/or the like. The genre conventions are captured by the genre parameters that specify default behavior for the linguistic realizer so that these aspects of language use do not have to continually re-specified by a user. Examples of genre parameters include, but are not limited to, the particular tense that should be used consistently throughout the text to be generated; a convention on the use of pronouns in the text to be generated; and/or a convention as to whether or not abbreviated names are to be used in the text to be generated. Alternatively or additionally, other elements of the phrase specification may be set by the one or more genre conventions.

At block 608, the microplanner document orchestration module, such as Microplanner Processor 113, is configured to determine if textual output was requested in the formatted instructions. For example, the formatted instructions may include instructions such as "target=text." If the output text is requested, the example method proceeds to block 610. If output text was not requested the example method proceeds to block 612.

At block 610, the microplanner document orchestration module, such as Microplanner Processor 113, is configured to output the input as a microplanned output. In some examples, the microplanned output may be an output phrase specification, such as a realization element. In some examples, the output of Microplanner Processor 113, may include the phrase specification as a realization element to a next step in a natural language generation pipeline, such as a syntax document orchestration module such as Syntax Processor 114. As the remaining modules of the pipeline complete, a textual output will be generated.

At block 612, the microplanner document orchestration module, such as Microplanner Processor 113, is configured to return the microplanned output to the document orchestrator. In some examples, Microplanner Processor 113 is configured to return the microplanned output as the orchestrated input. In some examples, Microplanner Processor 113 is configured to output the microplanned output to an output text processor such as Output Text Processor 160 via Communication Channel 140. The output of Output Text Processor 160 being, in this example, microplanned natural language text. In some examples, Microplanner Processor 113 is configured to output the microplanned output to Scripted File Processor 155, via Communication Channel 140, for further processing by Document Orchestrator 110.

FIG. 7 is a flowchart illustrating an example method for invoking a syntax document orchestration module, such as Syntax Processor 114, in a natural language document orchestrator, such as Document Orchestrator 110. In block 702, Document Orchestrator 110 is configured to start a syntax processor, such as Syntax Processor 114. In some examples, Document Orchestrator 110 starts the syntax module by invoking the syntax processor and passing the processor the formatted instructions. In some examples, Scripted File Processor 155 is configured to start Syntax Processor 114 through Communication Channel 130, by invoking Syntax Processor 114 and passing associated formatted instructions to Syntax Processor 114.

Alternatively or additionally, in some examples, Syntax Processor 114 is invoked by a microplanner document orchestration module, such as Microplanner Processor 113, as part of a natural language generation pipeline, which starts the syntax module by invoking Syntax Processor 114 and passing the processor a microplanned output, such as a realization element.

At block 704, the syntax document orchestration module, such as Syntax Processor 114 is configured to access an input, and apply syntactic rules to generate natural language.

In some examples, the input may be one or more realization elements outputted from a microplanner document orchestration module, such as Microplanner Processor 113. In some examples, the input may be realization elements contained in the formatted instructions received from Scripted File Processor 155. In some examples, the input may alternatively be instructions to perform a syntactic function, such as form a verb group.

In some examples, applying syntactic rules to generate natural language includes propagating features in the input. In some examples, applying syntactic rules to generate natural language may further include adding closed class function words and morphological inflections by utilizing rules from the formatted instructions to determine closed class function words and morphological inflections to add to the base words and phrases in the input.

In some examples, applying syntactic rules to generate natural language includes other syntactic functions such as forming a verb group. For example, Syntax Processor 114 may be configured to perform verb group formation (e.g., VerbGroup("eat", PAST) returns "ate" and VerbGroup ("eat", FUTURE, NEGATED) returns "will not eat").

At block 706, the syntax document orchestration module, such as Syntax Processor 114, is configured to determine if textual output was requested in the formatted instructions. For example, the formatted instructions may include instructions such as target=text. If the output text is requested, the example method proceeds to block 708. If output text was not requested the example method proceeds to block 710.

At block 708, the syntax document orchestration module, such as Syntax Processor 114, is configured output the syntactic output. In some examples, the syntactic output comprises an updated or syntactically processed input. In some examples, the syntactic output comprises text. In some examples, Syntax Processor 114 is configured to output the syntactic output to a next step in a natural language generation pipeline, such as a morphology document orchestration module, such as Morphology Processor 115.

At block 710, syntax document orchestration module, such as Syntax Processor 114, is configured to return the syntactic output to the document orchestrator. In some examples, Syntax Processor 114 is configured to output the syntactic output to an output text processor such as Output Text Processor 160 via Communication Channel 140. In some examples, Syntax Processor 114 is configured to output the syntactic output to Scripted File Processor 155, via Communication Channel 140, for further processing by Document Orchestrator 110.

FIG. 8 is a flowchart illustrating an example method for invoking a morphology document orchestration module, such as Morphology Processor 115, in a natural language document orchestrator, such as Document Orchestrator 110. In block 802, Document Orchestrator 110 is configured to start a morphology processor, such as Morphology Processor 115. In some examples, Document Orchestrator 110 starts the morphology module by invoking the morphology processor and passing the processor the formatted instructions. In some examples, Scripted File Processor 155 is configured to start Morphology Processor 115 through Communication Channel 130, by invoking Morphology Processor 115 and passing associated formatted instructions to Morphology Processor 115.

Alternatively or additionally and in some examples, Morphology Processor 115 is invoked by a syntax document orchestration module, such as Syntax Processor 114, as part of a natural language generation pipeline, which starts the morphology module by invoking the Morphology Processor 115 and passing the processor a syntactic output, such as a syntactically processed realization element.

At block 804, the morphology document orchestration module, such as Morphology Processor 115 is configured to access an input, and apply morphology rules to generate natural language. In some examples, applying morphology rules to generate natural language may include utilizing a base form of the word as a parameter and returning the plural form according to the formatted instructions and morphology rules (e.g., getPlural ("child") returns "children"). Another example includes, given an input "John, love, mango," wherein mango includes the plural feature (i.e., mango[number: plural]), the Morphology Processor 115 is configured to output "John loves mangoes."

Alternatively or additionally, and in some examples, the input may be one or more realization elements outputted from a syntax document orchestration module, such as Syntax Processor 114. In some examples, the input may be realization elements contained in the formatted instructions received from Scripted File Processor 155.

In some examples, applying morphology rules to generate natural language may include substituting a base word form in the input with an inflected word from a lexicon by searching the lexicon for the base word form and using the formatted instructions to determine which inflected form from the lexicon to substitute. In some examples, Morphology Processor 115 may be configured to utilize a lexicon stored in Content/Data Store 120.

In some examples, applying morphology rules to generate natural language may include utilizing a base word form for other realization operations, by using the formatted instructions to determine other morphological changes to the input.

At block 806, the morphology document orchestration module, such as Morphology Processor 115, is configured to determine if textual output was requested in the formatted instructions. For example, the formatted instructions may include instructions such as target=text. If the output text is requested, the example method proceeds to block 808. If output text was not requested the example method proceeds to block 810.

At block 808, the morphology document orchestration module, such as Morphology Processor 115, is configured to output a morphological output to a morphophonology module. In some examples, the morphological output comprises updated or morphologically processed input. In some examples, the morphological output comprises text. In some examples, Morphology Processor 115 is configured to output the morphological output to a next step in a natural language generation pipeline, such as a morphophonology document orchestration module, such as Morphophonology Processor 116

At block 810, the morphology document orchestration module, such as Morphology Processor 115, is configured to return the morphological output to the document orchestrator. In some examples, Morphology Processor 115 is configured to output the morphological output to an output text processor such as Output Text Processor 160 via Communication Channel 140. In some examples, Syntax Processor 114 is configured to output the morphological output to Scripted File Processor 155, via Communication Channel 140, for further processing by Document Orchestrator 110.

FIG. 9 is a flowchart illustrating an example method for invoking a morphophonology document orchestration module, such as Morphophonology Processor 116, in a natural language document orchestrator, such as Document Orchestrator 110. In block 902, Document Orchestrator 110 is configured to start a morphophonology processor, such as Morphophonology Processor 116. In some examples, Document Orchestrator 110 starts the morphophonology module by invoking the morphophonology processor and passing the processor the formatted instructions. In some examples, Scripted File Processor 155 is configured to start Morphophonology Processor 116 through Communication Channel 130, by invoking Morphophonology Processor 116 and passing associated formatted instructions to Morphophonology Processor 116.

Alternatively or additionally, in some examples, Morphophonology Processor 116 is invoked by a morphology document orchestration module, such as Morphology Processor 113, as part of a natural language generation pipeline, which starts the morphophonology module by invoking Morphophonology Processor 116 and passing the processor a morphological output, such as a morphologically processed realization element.

At block 904, the morphophonology document orchestration module, such as Morphophonology Processor 116 is configured to access an input, and apply morphophonology rules to generate natural language.

In some examples, the input may be realization elements outputted from a morphology document orchestration module, such as Morphology Processor 115. In some examples, the input may be realization elements contained in the formatted instructions received from Scripted File Processor 155.

In some examples, applying morphophonology rules to generate natural language includes accessing an input including the input "john attends an university", and outputting "a" instead of "an" according to morphophonological rules.

At block 906, the morphophonology document orchestration module, such as Morphophonology Processor 116, is configured to determine if textual output was requested in the formatted instructions. For example, the formatted instructions may include instructions such as target=text. If the output text is requested, the example method proceeds to block 908. If output text was not requested the example method proceeds to block 910.

At block 908, the morphophonology document orchestration module, such as Morphophonology Processor 116, is configured to output a morphophonological output to an orthography module. In some examples, the morphophonological output comprises updated or morphophonologically processed input. In some examples, the morphophonological output comprises text. In some examples, Morphophonology Processor 116 is configured to output the morphophonological output to a next step in a natural language generation pipeline, such as an orthography document orchestration module, such as Orthography Processor 117.

At block 910, the morphophonology document orchestration module, such as Morphophonology Processor 116, is configured to return the morphophonological output to the document orchestrator. In some examples, Morphophonology Processor 116 is configured to output morphophonological output to an output text processor such as Output Text Processor 160 via Communication Channel 140. In some examples, Morphophonology Processor 116 is configured to output the morphophonological output to Scripted File Processor 155, via Communication Channel 140, for further processing by Document Orchestrator 110.

FIG. 10 is a flowchart illustrating an example method for invoking an orthography document orchestration module, such as Orthography Processor 117, in a natural language document orchestrator, such as Document Orchestrator 110. In block 1002, Document Orchestrator 110 is configured to start an orthography processor, such as Orthography Processor 117. In some examples, Document Orchestrator 110 starts the orthography module by invoking the orthography processor and passing the processor the formatted instructions. In some examples, Scripted File Processor 155 is configured to start Orthography Processor 117 through Communication Channel 130, by invoking Orthography Processor 117 and passing associated formatted instructions to Orthography Processor 115.

Alternatively or additionally, in some examples, Orthography Processor 117 is invoked by a morphophonology document orchestration module, such as Morphophonology Processor 116, as part of a natural language generation pipeline, which starts the orthography module by invoking the Orthography Processor 115 and passing the processor a morphophonological output, such as a morphophonologically processed realization element.

At block 1004, the orthography document orchestration module, such as Orthography Processor 117 is configured to access an input, and apply orthography rules to generate natural language. In some examples, accessing an input, and applying orthographic rules to generate natural language comprises utilizing the formatted instructions to update the input by performing at least one or more of the steps described below in relation to blocks 1006, 1008, 1010, and 1012.

In some examples, the input may be realization elements outputted from a morphophonology document orchestration module, such as Morphophonology Processor 116. In some examples, the input may be realization elements contained in formatted instructions received from Scripted File Processor 155.

At block 1006, the orthography document orchestration module, such as Orthography Processor 117 is configured to capitalize individual words from the input, according to the formatted instructions.

At block 1008, the orthography document orchestration module, such as Orthography Processor 117 is configured to format numbers from the input such as applying currency or date formats according to the formatted instructions.

At block 1010, the orthography document orchestration module, such as Orthography Processor 117 is configured to perform punctuation operations on the input, according to the formatted instructions.

At block 1012, the orthography document orchestration module, such as Orthography Processor 117 is configured to place white space characters between words in the input, according to the formatted instructions.

In some examples, the orthography document orchestration module, such as Orthography Processor 117 is further configured to a particular genre parameter such as an orthography style, such as a western orthography. For example, this orthography style may provide instructions on the proper currency symbol to use, a proper date format, or the proper measurement convention.

At block 1014, the orthography document orchestration module, such as Orthography Processor 117, is configured to determine if textual output was requested in the formatted instructions. For example, the formatted instructions may include instructions such as target=text. If the output text is requested, the example method proceeds to block 1016. If output text was not requested the example method proceeds to block 1018.

At block 1016, the orthography document orchestration module, such as Orthography Processor 117, is configured to output orthographical output to a mark-up module. In some examples, the orthographical output comprises an updated or orthographically processed input. In some examples, the orthographical output comprises text. In some examples, Orthography Processor 117 is configured to output the orthographical output to a next step in a natural language generation pipeline, such as a mark-up document orchestration module, such as Mark-up Processor 118.

At block 1018, the orthography document orchestration module, such as Orthography Processor 117, is configured to return the orthographical output to the document orchestrator. In some examples, Orthography Processor 117 is configured to output the orthographical output to an output text processor such as Output Text Processor 160 via Communication Channel 140. In some examples, Orthography Processor 117 is configured to output the orthographical output to Scripted File Processor 155, via Communication Channel 140, for further processing by Document Orchestrator 110.

FIG. 11 is a flowchart illustrating an example method for invoking a mark-up document orchestration module, such as Mark-Up Processor 118, in a natural language document orchestrator, such as Document Orchestrator 110. In block 1102, Document Orchestrator 110 is configured to start a mark-up processor, such as Mark-Up Processor 118. In some examples, Document Orchestrator 110 starts the mark-up module by invoking the mark-up processor and passing the processor the formatted instructions. In some examples, Scripted File Processor 155 is configured to start Mark-Up Processor 118 through Communication Channel 130, by invoking Mark-Up Processor 118 and passing associated formatted instructions to Mark-Up Processor 118.

Alternatively or additionally, in some examples, Mark-up Processor 118 is invoked by an orthography document orchestration module, such as Orthography Processor 117, as part of a natural language generation pipeline, which starts the orthography module by invoking the orthography processor and passing the processor an orthographical output, such as a orthographically processed realization element.

At block 1104, the mark-up document orchestration module, such as Mark-Up Processor 118 is configured to access an input, and apply mark-up rules to generate natural language. In some examples, accessing an input, and applying mark-up rules to generate natural language comprises utilizing the formatted instructions to update the input by performing at least one or more of the steps described below.

In some examples, the input may be realization elements outputted from an orthography document orchestration module, such as Orthography Processor 117. In some examples, the input may be realization elements contained in formatted instructions received from Scripted File Processor 155.

In some examples, applying mark-up rules to generate natural language may include configuring an input "boldFont("apple")" to return "<B>apple<B>", if the output is marked to be output as HTML. In some examples, mark-up services can include outputting bold font or red text among other services.

In some examples, applying mark-up rules to generate natural language may include the methods described further in reference to block 1106.

At block 1006, the mark-up document orchestration module, such as Mark-Up Processor 118 is configured to convert internal markups found in the input into a mark-up format or plurality of formats that can be understood by a plurality of natural language text presentation systems.

At block 1108, the mark-up document orchestration module, such as Mark-Up Processor 118, is configured to output a marked-up output. In some examples, the marked-up output comprises updated or marked-up input. In some examples, the marked-up output comprises text. In some examples, Mark-Up Processor 118 is configured to output the marked-up output to a next step in a natural language generation pipeline, such as Output Text Processor 160, to produce natural language text. In some examples, Mark-Up Processor 118 is configured to output the marked-up output to Scripted File Processor 155, via Communication Channel 140, for further processing by Document Orchestrator 110.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method for generating natural language from a scripted input language file, the method comprising:
   accessing, using processing circuitry, the scripted input language file, wherein the scripted input language file comprises one or more document orchestration requests;
   parsing the one or more document orchestration requests using the processing circuitry, wherein each document orchestration request comprises an identification of a document orchestration module of one or more document orchestration modules and formatted instructions for execution by the document orchestration module;
   executing, using the processing circuitry, the one or more document orchestration requests by:
   invoking, using the processing circuitry, the document orchestration module identified by the document orchestration request,
   passing, using the processing circuitry, the document orchestration module the formatted instructions,
   receiving, using the processing circuitry, a natural language output from the document orchestration module; and
   processing, using the processing circuitry, the natural language output to generate natural language text;
   determining, using the processing circuitry, that all document orchestration requests of the parsed input language file have executed; and
   outputting, using the processing circuitry, natural language text for display via a user interface.

2. The method of claim 1, wherein a document orchestration module of the one or more document orchestration modules comprises one or more of:
   a content query processor;
   a document plan processor;
   a microplanner processor;
   a syntax processor;
   a morphology processor;
   a morphophonology processor;
   an orthography processor; and
   a mark-up processor.

3. The method of claim 2 further comprising:
   starting, using the processing circuitry, a content query processor;
   creating, using the processing circuitry, a new instance of a content query, based on the formatted instructions;
   utilizing, using the processing circuitry, the formatted instructions to at least perform one or more of:
   selecting, using the processing circuitry, a message type comprising one or more argument classes and one or more child classes of the content query, wherein the one or more argument classes and the one or more child classes identify the content to be queried;
   gathering one or more messages by querying, using the processing circuitry, a content store using argument class and child classes, wherein the one or more message instances comprise unordered portions of text representing the queried content; and
   sorting, using the processing circuitry, the one or messages by at least one of content sort properties and comparators; and
   outputting, using the processing circuitry, the sorted messages.

4. The method of claim 2 further comprising:
   starting, using the processing circuitry, a document planner processor;
   instantiating, using the processing circuitry, a document plan with one or more messages based on the formatted instructions; and
   outputting, using the processing circuitry, the document plan.

5. The method of claim 2 further comprising:
   starting, using the processing circuitry, a microplanner processor;
   accessing, using the processing circuitry, an input;
   utilizing, using the processing circuitry, the formatted instructions to at least perform, using the processing circuitry, one or more of:
   converting at least one message from the document plan into a phrase specification;
   applying one or more of lexicalization rules, aggregation rules, or referring expression rules to the phrase specification; and
   determining aspects of ordering not specified in the document plan; and
   outputting a microplanned output.

6. The method of claim 2 further comprising:
   starting, using the processing circuitry, a syntax processor
   accessing, using the processing circuitry, an input, and applying, using the processing circuitry, syntactic rules to generate natural language; and
   outputting, using the processing circuitry, a syntactic output.

7. The method of claim 2 further comprising:
   starting, using the processing circuitry, a morphology processor;
   accessing, using the processing circuitry, an input, and applying morphology rules to generate natural language;
   substituting, using the processing circuitry, a base word form in the input with an inflected word form a lexicon by searching the lexicon for the base word form and using the formatted instructions to determine which inflected form from the lexicon to substitute;
   utilizing, using the processing circuitry, a base word form for other realization operations, by using the formatted instructions to determine other morphological changes to the input; and
   outputting, using the processing circuitry, a morphological output.

8. The method of claim 2 further comprising:
   starting, using the processing circuitry, a morphophonology processor;
   accessing, using the processing circuitry, an input, and applying morphophonology rules to generate natural language; and
   outputting, using the processing circuitry, a morphophonological output.

9. The method of claim 2, further comprising:
   starting, using the processing circuitry, a orthography processor;
   accessing, using the processing circuitry, an input, and applying, using the processing circuitry, orthography rules to generate natural language by:
   capitalizing individual words;
   formatting numbers such as applying currency or date formats;
   performing punctuation operations; or
   placing white space characters between words; and
   outputting, using the processing circuitry, an orthographical output.

10. The method of claim 2 further comprising:
starting, using the processing circuitry, a mark-up processor;
accessing, using the processing circuitry, an input, and applying mark-up rules to generate natural language;
converting, using the processing circuitry, internal mark-ups found in the input into a mark-up format or plurality of formats that can be understood by a plurality of natural language text presentation systems; and
outputting, using the processing circuitry, a marked-up output.

11. The method of claim 1, wherein the scripted input language file includes at least partially orchestrated natural language text.

12. The method of claim 1, wherein the natural language output of the invoked document orchestration module is processed by further orchestration requests of the scripted input language file or outputted directly to the output text processor.

13. An apparatus comprising:
processing circuitry; and
at least one memory including computer program code, the at least one memory and the computer program code configured to, with the processing circuitry, cause the apparatus to at least:
access a scripted input language file, wherein the scripted input language file comprises one or more document orchestration requests;
parse the one or more document orchestration requests by a processor, wherein each document orchestration request comprises an identification of a document orchestration module of one or more document orchestration modules and formatted instructions for execution by the document orchestration module;
execute the one or more document orchestration requests by:
invoking the document orchestration module identified by the document orchestration request,
passing the document orchestration module the formatted instructions,
receiving a natural language output from the document orchestration module, and
processing the natural language output to generate natural language text; and
determine that all document orchestration requests of the parsed input language file have executed; and
output natural language text for display via a user interface.

14. The apparatus of claim 13, wherein a document orchestration module of the one or more document orchestration modules comprises:
a content query processor;
a document plan processor;
a microplanner processor;
a syntax processor;
a morphology processor;
a morphophonology processor;
an orthography processor; and
a mark-up processor.

15. The apparatus of claim 13, wherein the scripted input language file includes at least partially orchestrated natural language text.

16. The apparatus of claim 13, wherein the at least one memory and the computer program code are further configured to, with the processing circuitry, cause the apparatus to further process the natural language output of the invoked document orchestration module by invoking further orchestration requests of the scripted input language file or output the natural language output directly to the output text processor.

17. The apparatus of claim 13, wherein the at least one memory and the program code instructions are further configured to, when executed by the processing circuitry, cause the apparatus to further process the natural language output of the invoked document orchestration module by invoking further orchestration requests of the scripted input language file or output the natural language output directly to the output text processor.

18. A computer program product comprising:
at least one computer readable non-transitory memory medium having program code instructions stored thereon, the program code instructions which when executed by processing circuitry cause an apparatus at least to:
access a scripted input language file, wherein the scripted input language file comprises one or more document orchestration requests;
parse the one or more document orchestration requests by a processor, wherein each document orchestration request comprises an identification of a document orchestration module of one or more document orchestration modules and formatted instructions for execution by the document orchestration module;
execute the one or more document orchestration requests by:
invoking the document orchestration module identified by the document orchestration request,
passing the document orchestration module the formatted instructions,
receiving a natural language output from the document orchestration module, and
processing the natural language output to generate natural language text; and
determine that all document orchestration requests of the parsed input language file have executed; and
output natural language text for display via a user interface.

19. The computer program product of claim 18, wherein a document orchestration module of the one or more document orchestration modules comprises:
a content query processor;
a document plan processor;
a microplanner processor;
a syntax processor;
a morphology processor;
a morphophonology processor;
an orthography processor; and
a mark-up processor.

20. The computer program product of claim 18, wherein the scripted input language file includes at least partially orchestrated natural language text.

* * * * *